US006970196B1

(12) United States Patent  (10) Patent No.: US 6,970,196 B1
Ishikawa et al.  (45) Date of Patent: Nov. 29, 2005

(54) HIGH-SPEED VISION SENSOR WITH IMAGE PROCESSING FUNCTION

(75) Inventors: Masatoshi Ishikawa, Kashiwa (JP); Haruyoshi Toyoda, Hamamatsu (JP)

(73) Assignee: Hamamatsu Photonics K.K., Hamamatsu (JP)

( * ) Notice: Subject to any disclaimer, the term of this patent is extended or adjusted under 35 U.S.C. 154(b) by 0 days.

(21) Appl. No.: 09/936,267

(22) PCT Filed: Mar. 10, 2000

(86) PCT No.: PCT/JP00/01471

§ 371 (c)(1),
(2), (4) Date: Sep. 10, 2001

(87) PCT Pub. No.: WO00/55810

PCT Pub. Date: Sep. 21, 2000

(30) Foreign Application Priority Data

Mar. 16, 1999 (JP) .................................. 11-70121

(51) Int. Cl.[7] ...................... H04N 5/335; G05B 15/00; G06F 15/00
(52) U.S. Cl. .................. 348/308; 348/222.1; 712/10; 700/259
(58) Field of Search ........ 700/4, 258, 259; 712/10–22; 348/222.1, 294, 302, 308; 250/208.1, 370.08; 382/153; 257/291, 292

(56) References Cited

U.S. PATENT DOCUMENTS

| 5,113,365 | A | * | 5/1992 | Yang | ........................ 708/801 |
| 6,362,482 | B1 | * | 3/2002 | Stettner et al. | ........ 250/370.08 |
| 6,460,127 | B1 | * | 10/2002 | Akerib | ........................ 712/10 |
| 6,507,362 | B1 | * | 1/2003 | Akerib | ........................ 725/109 |
| 6,608,296 | B1 | * | 8/2003 | Toyoda et al. | ............ 250/208.1 |
| 6,665,013 | B1 | * | 12/2003 | Fossum et al. | ............. 348/308 |
| 6,757,019 | B1 | * | 6/2004 | Hsieh et al. | ................ 348/302 |

FOREIGN PATENT DOCUMENTS

| JP | A 62-295174 | 12/1987 |
| JP | A 63-113659 | 5/1988 |
| JP | A 8-235149 | 9/1993 |
| JP | A 6-20070 | 1/1994 |
| JP | A 6-195480 | 7/1994 |
| JP | A 6-274467 | 9/1994 |
| JP | A 10-145680 | 5/1998 |

OTHER PUBLICATIONS

U.S. Appl. No. 09/807,039, filed Apr. 9, 2001, Toyoda et al.
"Artificial retinas-fast, versatile image processors", Kazuo Kyuma et al., Nature, vol. 372, Nov. 10, 1994.

(Continued)

*Primary Examiner*—Wendy R. Garber
*Assistant Examiner*—Justin Misleh
(74) *Attorney, Agent, or Firm*—Oliff & Berridge, PLC

(57) ABSTRACT

A high-speed vision sensor includes: an analog-to-digital converter array 13, in which one analog-to-digital converter 210 is provided in correspondence with all the photodetector elements 120 that are located on each row in a photodetector array 11; a parallel processing system 14 that includes processor elements 400 and shift registers 410, both of which form a one-to-one correspondence with the photodetector elements 120; and data buses 17, 18 and data buffers 19 and 20 for data transfer to processing elements 400. The processing elements 400 perform high-speed image processing between adjacent pixels by parallel processings. By using the data buses 17, 18, it is possible to attain, at a high rate of speed, such calculation processing that requires data supplied from outside.

7 Claims, 20 Drawing Sheets

OTHER PUBLICATIONS

"Computing Motion Using Analog and Binary Resistive Networks", James Hutchinson et al., Computer, vol. 21, Mar. 1988, pp. 52-64, IEEE.

"An Object Position and Orientation IC with Embedded Imager", David L. Standley, Solid State Circuits, vol. 26, No. 12, Dec. 1991, pp. 1853-1859, IEEE.

* cited by examiner

HIGH-SPEED VISION SENSOR WITH IMAGE PROCESSING FUNCTION

TECHNICAL FIELD

The present invention relates to a high-speed vision sensor having an image processing function.

BACKGROUND ART

High-speed image processing is required to operate high-speed robots in a factory automation (FA) system or the like. For example, when a robot is configured with a feedback loop between its vision sensor and its actuator, the actuator can be controlled in units of milliseconds. Accordingly, the image processing speed that matches this speed is required. However, because the image processing speed in modern vision systems is limited by the video frame rate, the robot can only operate at low speeds that match this image processing speed. It is impossible to take full advantage of the robot's performance.

There are some high-speed CCD cameras that can take images at intervals of about one (1) millisecond. In these devices, the images are temporarily stored in memory and later read and processed. Therefore, the devices can be applied to such applications as image analysis. However, the devices have almost no real-time capability, and are not suitable for controlling robots or similar real-time applications.

In order to overcome these problems, institutes such as the Massachusetts Institute of Technology, the California Institute of Technology, and Mitsubishi Electric Corporation have been researching a vision chip that combines the image reading portion and the processing portion into one unit ("An Object Position and Orientation IC with Embedded Imager," David L. Standley, *Solid State Circuits*, Vol. 26, No. 12, December 1991, pp. 1853–1859, IEEE); "Computing Motion Using Analog and Binary Resistive Networks," James Hutchinson, et al., *Computer*, Vol. 21, March 1988, pp. 52–64, IEEE); and "Artificial Retinas—fast versatile image processors," Kazuo Kyuma, et al., *Nature*, Vol. 372, Nov. 10, 1994). However, these chips employ a fixed analog circuit that is easy to integrate. Accordingly, these circuits have various shortcomings. That is, the circuits require subsequent-processing of output signals. The type of image processing they can perform is limited to special applications. The circuits have a lack of universality.

Japanese Unexamined Patent Application Publication No. HEI-10-145680 has proposed a vision chip that is capable of performing universal image processing. This vision chip is provided with a processing element for each photodetector. An analog-to-digital converter is provided for each photodetector row. The vision chip can reduce the processing time through parallel processing. The vision chip can also reduce the number of transmission lines between the photodetectors and the processing elements, achieving an optimal integration level for both.

It is noted that the center of gravity (first order moment) of an image is information that is required in many image processings. In order to calculate the center of gravity of an image, it is necessary to perform calculation onto image data of each pixel and positional information (x direction positional information and y direction positional information) of the subject pixel. It is therefore necessary to store, in advance, positional information of each pixel in a memory. When using the technology in the Japanese Unexamined Patent Application Publication No. HEI-10-145680, it is necessary to transfer, in advance, positional information of respective pixels from a control circuit to the corresponding processing elements in succession. Each processing element performs calculation onto image data that is received from a corresponding photodetector and its positional data, and outputs the calculated result. It requires a lot of time to transfer the positional information to the processing elements. It is desirable to enhance the speed of such a basic image processing operation.

DISCLOSURE OF THE INVENTION

In view of the foregoing, it is an object of the present invention to provide a multi-pixel high-speed vision sensor which has a simple circuit construction and which is capable of performing basic image processing at a high speed.

In order to attain the above-described object, the present invention provides a high-speed vision sensor, comprising: a photodetector array having a plurality of photodetectors, which are arranged two-dimensionally in a plurality of rows and in a plurality of columns; an analog-to-digital converter array having a plurality of analog-to-digital converters which are arranged one-dimensionally such that each analog-to-digital converter corresponds to one row in the photodetector array, each analog-to-digital converter converting, into digital signals, analog signals which are successively outputted from the photodetectors in the corresponding row; a parallel processing system including a parallel processing element array, the parallel processing element array having a plurality of processing elements which are arranged two-dimensionally in a plurality of rows and in a plurality of columns and in one-to-one correspondence with the plurality of photodetectors in the photodetector array, each processing element performing a predetermined calculation on digital signals which are transferred from the analog-to-digital converter array; a column-direction data-transfer bus including a plurality of column-direction data-transfer data lines which are arranged in one to one correspondence with the plurality of columns in the parallel processing system, each column-direction data-transfer data line being connected to the processing elements that are located in the corresponding column and performing data transfer operation with each processing element in the corresponding column; a row-direction data-transfer bus including a plurality of row-direction data-transfer data lines which are arranged in one to one correspondence with the plurality of rows in the parallel processing system, each row-direction data-transfer data line being connected to the processing elements that are located in the corresponding row and performing data transfer operation with each processing element in the corresponding row; and a control circuit controlling the photodetector array, the analog-to-digital converter array, the parallel processing system, the column-direction data-transfer bus, and the row-direction data-transfer bus, and performing data transfer operation with the processing elements via the column-direction data-transfer bus and the row-direction data-transfer bus, the control circuit controlling a combination of data to be transferred via each column-direction data-transfer data line to the corresponding processing elements and data to be transferred via each row-direction data-transfer data line to the corresponding processing elements, thereby controlling each processing element to perform a processing that is determined based on the combination of data received from the corresponding column-direction data-transfer data line and data received from the corresponding row-direction data-transfer data line.

According to the present invention, the plurality of processing elements are provided in one to one correspondence with the plurality of photodetectors. It is therefore possible to perform high-speed image processing operation by parallel processing. Additionally, the analog-to-digital converter is provided to each row. Accordingly, the total number of transmission paths can be reduced.

Additionally, there are provided, with respect to each processing element, a data bus which is dedicated to transferring data in a row direction, and another data bus which is dedicated to transferring data in a column direction. It is therefore possible to perform various image processing calculations. It is possible to attain a flexible processing performance while maintaining the architecture suitable for integration of the semiconductor elements.

For example, it is preferable that the control circuit includes a center-of-gravity calculation control portion for controlling each column-direction data-transfer data line to perform data transfer operation to transfer data indicative of positional information of the corresponding column to the processing elements on the corresponding column, for controlling each row-direction data-transfer data line to perform data transfer operation to transfer data indicative of positional information of the corresponding row to the processing elements on the corresponding row, and for controlling each processing element to perform a predetermined calculation to calculate a center of gravity of the digital signals based on the received data indicative of the positional information of the corresponding row and the received data indicative of the postional information of the corresponding column. Because the dedicated data buses are provided both in the column direction and in the row direction, it is possible to efficiently transfer the positional information by using a small number of data-transfer line systems. The positional information is required for performing the center-of-gravity calculation, which is a basic calculation for image processings.

By using the dedicated data buses, it is also possible to individually access the respective processing elements.

For example, it is preferable that the control circuit includes a control portion for controlling a predetermined processing element to perform a predetermined calculation onto the digital signals by controlling a column-direction data-transfer data line that is connected to the predetermined processing element and a row-direction data-transfer data line that is connected to the predetermined processing element to perform data transfer operation to transfer a predetermined combination of calculation-control data. In this case, it is possible to control individual processing elements to perform different calculation operations.

It is preferable that the control circuit includes a data transfer control portion. In this case, it becomes possible to transfer a calculation result obtained at some particular-processing element to the control circuit for controlling a column-direction data-transfer data line that is connected to a predetermined processing element and a row-direction data-transfer data line that is connected to the predetermined processing element to perform data transfer operation to transfer a predetermined combination of calculation-control data, thereby allowing calculation result data, obtained at the predetermined processing element, to be transferred to the control circuit.

It is preferable that the high-speed vision sensor may further comprise data buffers which are provided in correspondence with the column-direction data-transfer bus and the row-direction data-transfer bus, respectively. By providing the high-speed vision sensor with the data buffers, it is possible to perform high speed data transfer operation even when data transfer speed between the control circuit and the data transfer buses is low. By integrating together the parallel processing system, the data transfer buses, and the data buffers, it is possible to relatively easily enhance the data transfer speed, at which data is transferred between the processing elements and the buffers.

It is preferable that the parallel processing system further includes a shift register array, the shift register array having a plurality of shift registers which are disposed in one-to-one correspondence with the plurality of analog-to-digital converters and in one-to-one correspondence with the plurality of rows of processing elements, each shift register successively transferring digital signals, which are outputted from the corresponding analog-to-digital converter and which are equivalent to signals outputted from the photodetectors in a corresponding photodetector row, to predetermined processing elements in the corresponding row. The shift registers are used as being dedicated to transferring data to the processing elements. Accordingly, calculation processing can be performed even during the transfer process. Processing can be performed efficiently by reducing the wait time for both of the transfer process and the calculation process, thereby reducing the overall processing time. It is possible to achieve a pipeline operation, and to perform a high-speed image processing, and particularly real-time processing. According to another aspect, the present invention provides a high-speed vision sensor, comprising: a photodetector array having a plurality of photodetectors, which are arranged two-dimensionally in a plurality of rows and in a plurality of columns; an analog-to-digital converter array having a plurality of analog-to-digital converters which are arranged one-dimensionally such that each analog-to-digital converter corresponds to one row in the photodetector array, each analog-to-digital converter converting, into digital signals, analog signals which are successively outputted from the photodetectors in the corresponding row; a parallel processing system including a parallel processing element array, the parallel processing element array having a plurality of processing elements which are arranged two-dimensionally in a plurality of rows and in a plurality of columns and in one-to-one correspondence with the plurality of photodetectors in the photodetector array, each processing element performing a predetermined calculation on digital signals which are transferred from the analog-to-digital converter array; a column-direction data-transfer bus including a plurality of column-direction data-transfer data lines which are arranged in one to one correspondence with the plurality of columns in the parallel processing system, each column-direction data-transfer data line being connected to the processing elements that are located in the corresponding column and performing data transfer operation with each processing element in the corresponding column; a row-direction data-transfer bus including a plurality of row-direction data-transfer data lines which are arranged in one to one correspondence with the plurality of rows in the parallel processing system, each row-direction data-transfer data line being connected to the processing elements that are located in the corresponding row and performing data transfer operation with each processing element in the corresponding row; and a control circuit controlling the photodetector array, the analog-to-digital converter array, the parallel processing system, the column-direction data-transfer bus, and the row-direction data-transfer bus, and performing data transfer operation with the processing elements via the column-direction data-transfer bus and the row-direction data-transfer bus, the control circuit receiving data from each processing element via both of the corresponding column-direction data-transfer data line and the corresponding row-direction data-transfer data line, and determining the position of a processing element that has outputted predetermined data, based on the combination of a column-direction data-transfer data line that has transferred the predetermined data and a row-direction data-transfer data line that has transferred the predetermined data.

BEST MODE FOR CARRYING OUT THE INVENTION

Figure 1:
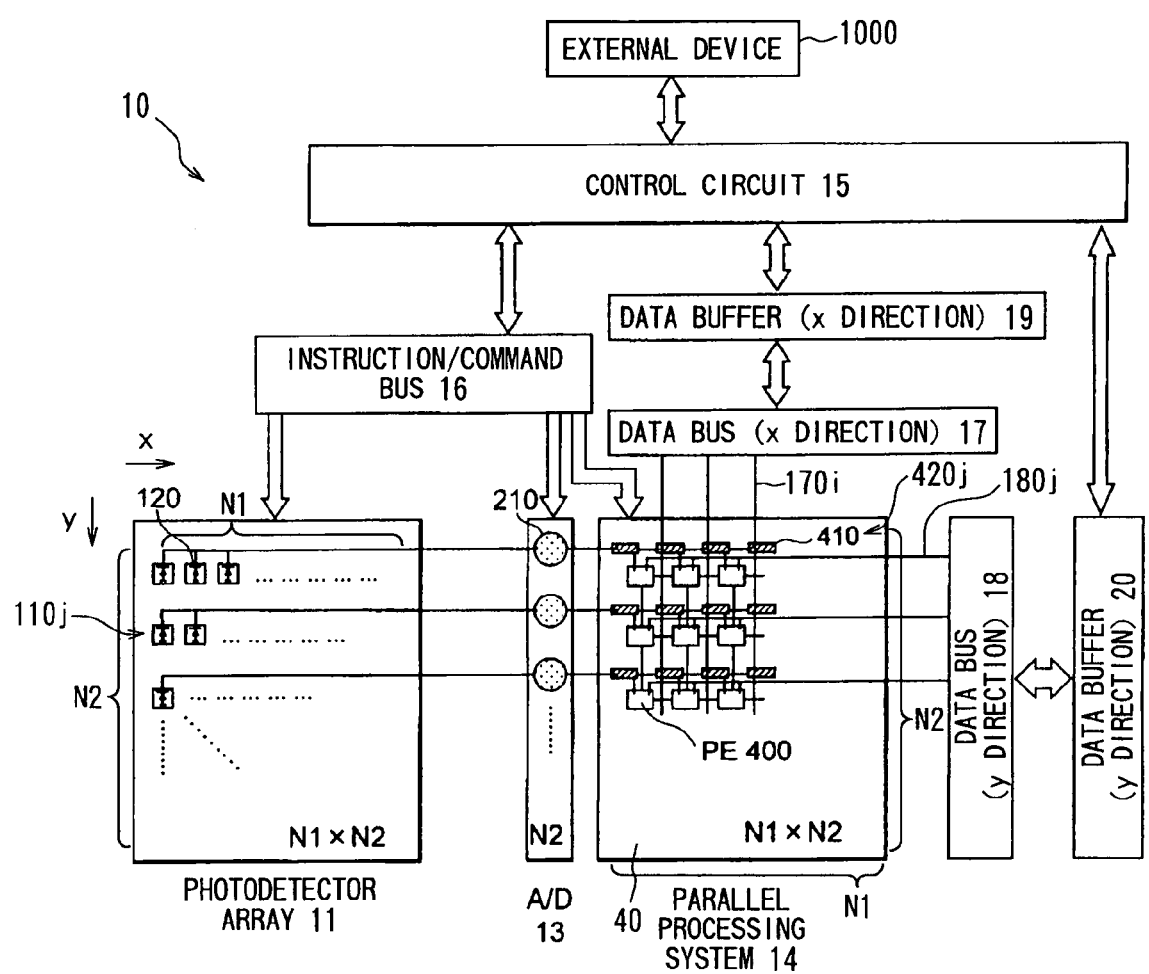
FIG. 1 is a block diagram showing a high-speed vision sensor according to an embodiment of the present invention.

A high-speed vision sensor according to a preferred embodiment of the present invention will be described while referring to FIGS. 1–16.

It is noted that the same parts or components are designated by the same reference numerals to avoid duplicating description.

Figure 2:
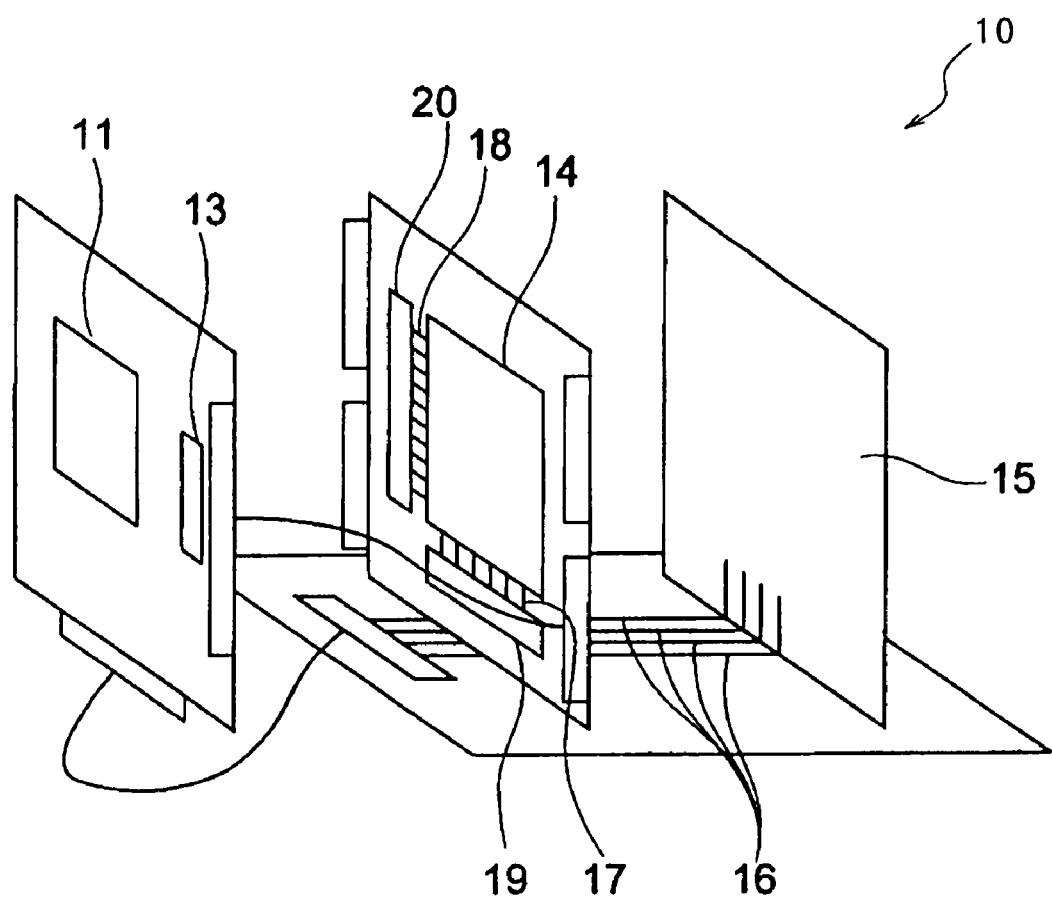
FIG. 2 is a schematic view showing the construction of the high-speed vision sensor of the embodiment.

FIG. 1 is a block diagram showing the high-speed vision sensor 10 according to the present embodiment. FIG. 2 shows an example of the structure of the sensor 10.

First, a brief description will be given for the overall configuration of the high-speed vision sensor 10, with reference to FIG. 1. The high-speed vision sensor 10 of the present embodiment includes a photodetector array 11, an analog-to-digital converter array 13, a parallel processing system 14, a control circuit 15, an x-direction data bus 17, a y-direction data bus 18, an x-direction data buffer 19, a y-direction data buffer 20, an instruction/command bus 16, and an output bus 155 (FIG. 6) to be described later. Data of the vision sensor process program and of the image process program is transmitted to the control circuit 15 by an external device 1000 (an external computer, for example).

N1×N2 photodetectors 120 are arranged two-dimensionally (that is, N2 rows×N1 columns) in the photodetector array 11. In other words, a horizontal photodetector row 110 is defined to include N1 photodetectors 120 which are lined up in the horizontal direction (X direction). The photodetector array 11 includes N2 horizontal photodetector rows 110, which are arranged vertically (Y direction), that is, orthogonal to the horizontal direction (X direction).

The analog-to-digital converter array 13 includes N2 analog-to-digital converters 210 which are arranged one-dimensionally (vertically (y direction)). N2 analog-to-digital converters 210 are arranged in one-to-one correspondence with the N2 horizontal photodetector rows 110 in the photodetector array 11. Each analog-to-digital converter 210 is for successively converting electric charges, outputted from photodetectors 120 that belong to a corresponding horizontal photodetector row 110, into voltage signals and then further analog-to-digital converting the voltage signals into digital signals.

The parallel processing system 14 is provided with a processing element array 40. The processing element array 40 includes N1×N2 processing elements (PE) 400 which are arranged two-dimensionally (that is, N2 rows×N1 columns) in one-to-one correspondence with the photodetectors 120. The processing element array 40 is also provided with N2 shift register lines 420 (lines of shift registers for transferring image data) in one-to-one correspondence with the N2 rows of processing elements. Each shift register line 420 includes N1 shift registers 410 (shift registers for image data transfers). The total number N1 of the shift registers in each line 420 is equal to the total number of processing elements 400 in the corresponding row. In each shift register line 420, the constituent N1 shift registers 410 are connected with one another in series. Each shift register 410 is connected to a corresponding processing element 400 in the corresponding row.

Figure 6:
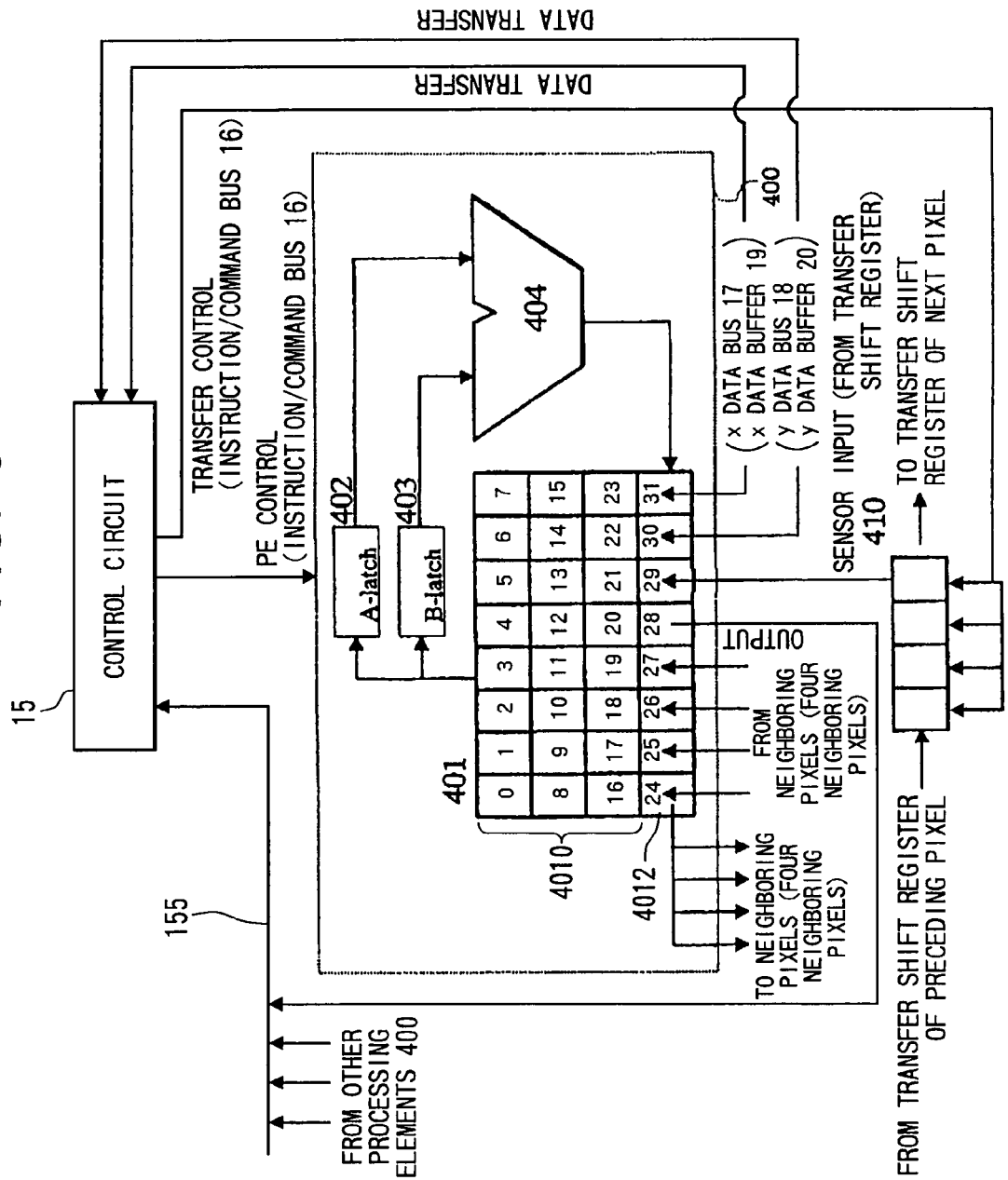
FIG. 6 is a block diagram showing a processing element and a shift register employed in the high-speed vision sensor of the embodiment.
Figure 7:
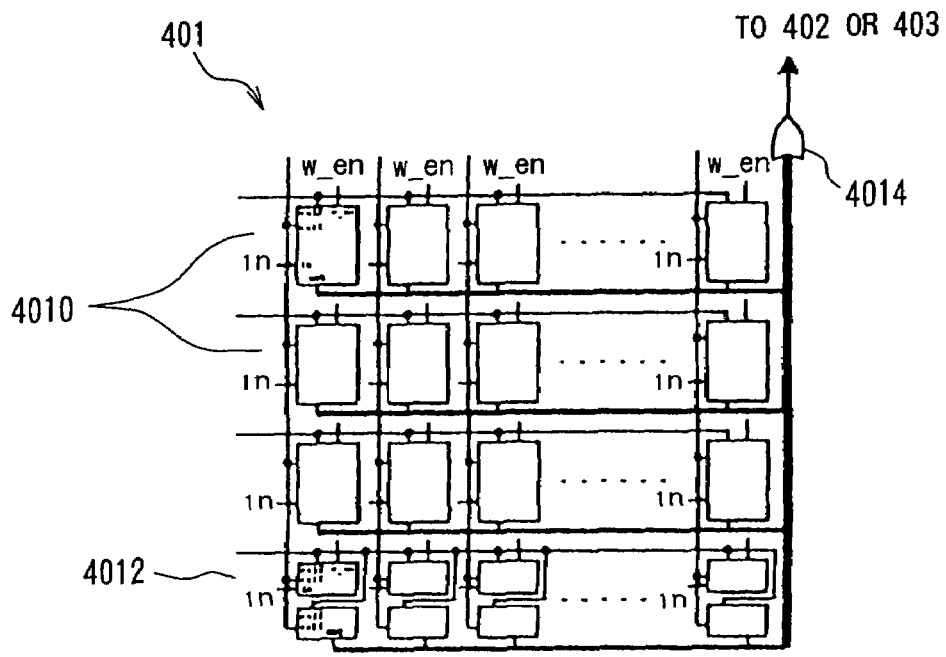
FIG. 7(A) is a circuit diagram showing a register matrix employed in the processing element of FIG. 6.
FIG. 7(B) is a control timing chart of the processing element of FIG. 6.
Figure 7:
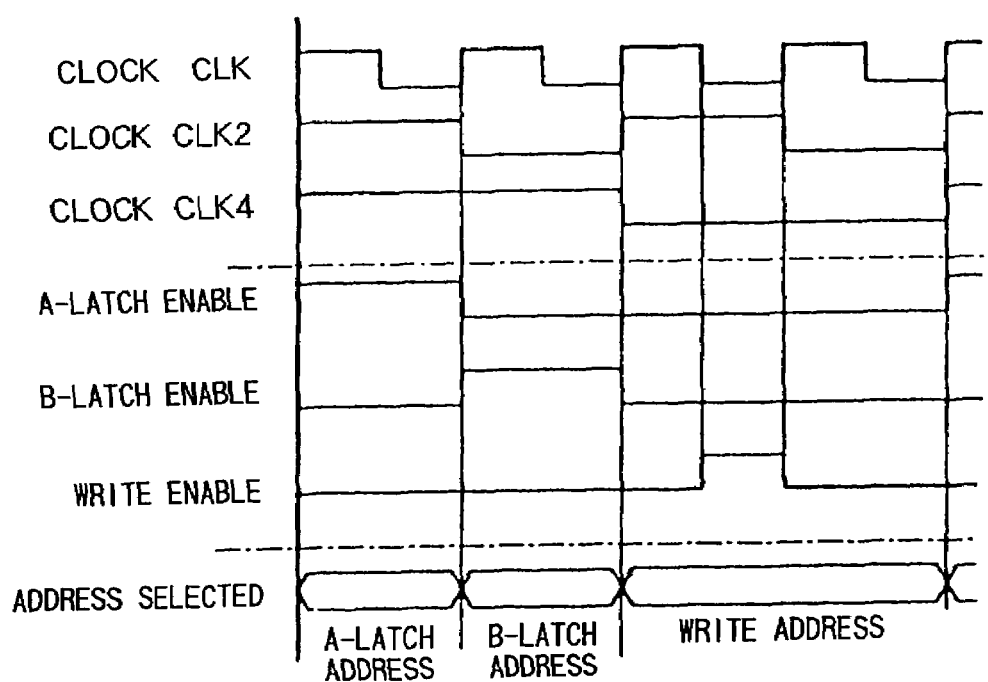

The control circuit 15 is for controlling the entire circuit in the high-speed vision sensor 10 by transmitting command signals and data thereto. The x-direction data bus 17 is connected to the processing elements 400 in the respective columns. The x-direction data bus 17 is for transferring data to each processing element 400 in each column. The y-direction data bus 18 is connected to the processing elements 400 in the respective rows. The y-direction data bus 18 is for transferring data to each processing element 400 in each row. The x-direction data buffer 19 is connected between the x-direction data bus 17 and the control circuit 15. The y-direction data buffer 20 is connected between the y-direction data bus 18 and the control circuit 15. In this way, the x-direction data bus 17 is connected to the control circuit 15 via the x-direction data buffer 19. The y-direction data bus 18 is connected to the control circuit 15 via the y-direction data buffer 20. The instruction/command bus 16 is for transferring signals from the control circuit 15 to the photodetector array 11, the analog-to-digital converter array 13, and the parallel processing system 14. As shown in FIG. 6 to be described later, the control circuit 15 is further connected to all the processing elements 400 via the single output bus 155.

With this configuration, N2 data lines are used in the high-speed vision sensor 10 to connect the photodetector array 11 with the parallel processing system 14. Accordingly, the photodetector array 11 and the parallel processing system 14 can be formed on separate circuit boards, as shown in FIG. 2, in a configuration that enables the operations of each device to be verified separately. Therefore, production of the high-speed vision sensor 10 can be more stable. Further, by forming the photodetector array 11 and the parallel processing system 14 on separate circuit boards in this way, it is possible to manufacture both devices with a high level of integration. In addition, it is possible to employ a processing method suitable for the characteristics of each device, thereby enabling a more stable production. The data buses 17 and 18 and the data buffers 19 and 20 for the x- and y-directions may be formed on the same circuit board with the parallel processing system 14 as shown in the drawing. Alternatively, they may be formed on circuit boards which are prepared separately from the circuit board, on which the parallel processing system 14 is formed. It is especially preferable that the data buses 17 and 18 and the data buffers 19 and 20 are integrated together with the parallel processing system 14. It becomes easy to increase the data transfer speed between the data buffers 19 and 20 and the processing elements 400. Because each component of the high-speed vision sensor 10 can be entirely created using the CMOS process, it is possible to create all the components on one chip, thereby greatly reducing production costs.

Next, the components of each circuit will be described.

Figure 3:
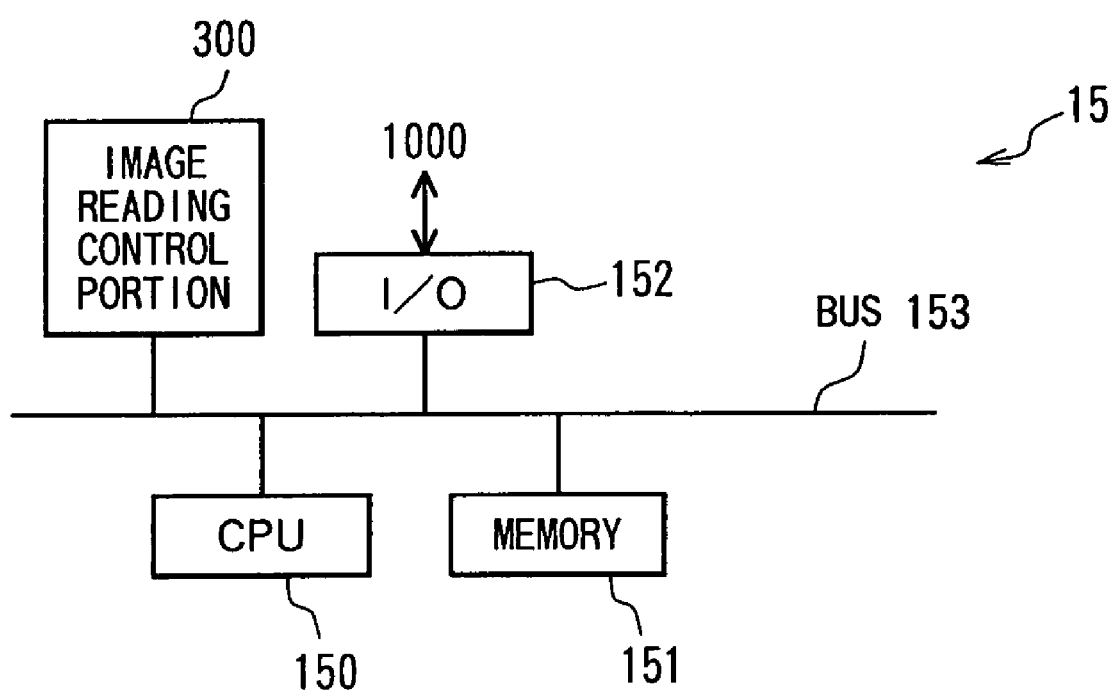
FIG. 3 is a structural block diagram showing a control circuit employed in the high-speed vision sensor of the embodiment.

FIG. 3 is a block diagram showing the construction of the control circuit 15. The control circuit 15 includes a CPU 150, a memory 151, an image reading control portion 300 (see FIG. 4), and an input/output interface 152. All of these components are connected by a bus 153. The input/output interface 152 is for performing input/output operation with an external device. The memory 151 stores therein data of programs to be executed by the CPU 150. The programs include: a vision sensor process program (shown in FIG. 8) which will be described later; and an image process program for controlling the parallel processing system 14 to execute a parallel image processing (FIGS. 9–12, FIG. 13, FIG. 14, FIG. 15, or FIG. 16, for example) during an image processing step (S110 in FIG. 8) of the vision sensor process program. Data of the vision sensor process program and of the image process program is written in the memory 151 via the I/O interface 152 by an external device 1000 (an external computer, for example). The bus 153 includes a command bus and a data bus (not shown), and is connected to: the instruction/command bus 16, the data buffers 19 and 20 shown in FIG. 1, and the output bus 155 shown in FIG. 6.

Based on the vision sensor process program stored in the memory 151, the CPU 150 controls the photodetector array 11 and the analog-to-digital converter array 13, via the image reading control portion 300, and controls the parallel processing system 14. More specifically, the CPU 150 controls the image reading control portion 300 (FIG. 4) (during S101 of FIG. 8) to pick up images by using the photodetector array 11 and the analog-to-digital converter array 13. The CPU 150 also controls both of: data transfers executed by the shift registers 410 in the parallel processing system 14, and calculations executed by the processing elements 400 (in S102–S104 and in S110 of FIG. 8), thereby achieving a single instruction and multi-data stream (SIMD) parallel processing. The CPU 150 further performs required calculations while the parallel processing system 14 is executing the parallel processing. The CPU 150 further performs other necessary calculations, and makes determinations based on processing results obtained by the parallel processing system 14. By using the input/output interface 152, the CPU 150 communicates with the external device 1000, such as an external computer, or controls another external device 1000, such as an external actuator. For example, the CPU 150 outputs the calculated results to the external computer, or controls the external actuator based on the calculated results.

Next, the structure of the photodetector array 11 and the analog-to-digital converter array 13, which serve as an image reading portion, will be described in detail with reference to FIGS. 4 and 5.

The photodetector array 11 functions as a light receiving unit for detecting light. The analog-to-digital converter array 13 functions as a signal processing unit for converting electric current signals outputted from the photodetector array 11 into voltage signals and further for performing analog-to-digital conversion onto the voltage signals. The image reading control portion 300, in the control circuit 15, is connected to the photodetector array 11 and the analog-to-digital converter array 13. The image reading control portion 300 functions as a timing control unit for transmitting instruction signals, indicative of operation timings, to the photodetector array 11 and the analog-to-digital converter array 13.

First, the structure of the photodetector array 11 (light receiving portion) will be described.

Figure 4:
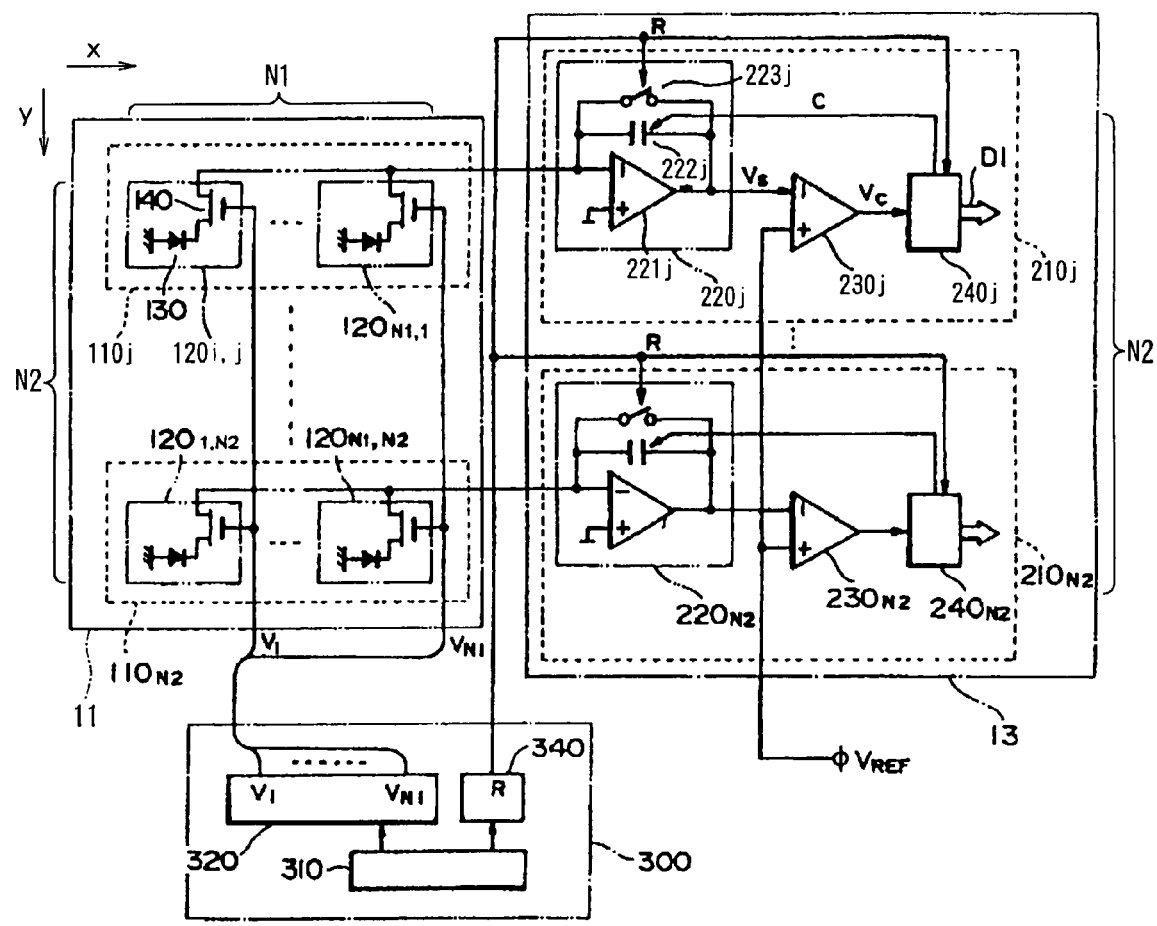
FIG. 4 is a circuit diagram showing a photodetector array and an analog-to-digital converter array provided in the high-speed vision sensor of the embodiment.

As shown in FIG. 4, each photodetector 120 is configured from a photoelectric conversion element 130 and a switch element 140. The photoelectric conversion element 130 is for generating an electric charge according to the intensity of received light. The switch element 140 is connected to a signal output terminal of the photoelectric conversion element 130. The switch element 140 outputs the electric charge, accumulated in the photoelectric conversion element 130, in response to a horizontal scan signal $V_i$ (i=1~N1). Each horizontal photodetector row 110 is constructed from N1 photodetectors 120 which are arranged in the horizontal direction (x-direction) with their switch elements 140 being connected with one another. The photodetector array 11 is constructed from N2 horizontal photodetector rows 110 which are arranged vertically (in the y-direction), that is, perpendicularly to the horizontal direction. Thus, the photodetectors $120_{i,j}$ (i=1~N1, j=1~N2) are arranged two-dimensionally in N1 columns×N2 rows.

Next, the structure of the analog-to-digital converter array 13 will be described with reference to the same FIG. 4. The analog-to-digital converter array 13 serves as the signal processing unit.

The analog-to-digital converter array 13 is constructed from N2 analog-to-digital converters $210_j$ (j=1~N2). Each analog-to-digital converter $210_j$ is for individually extracting electric charges transmitted from the respective photodetectors in the corresponding horizontal photodetector row $110_j$ (j=1~N2), for processing the electric charges, and for outputting digital signals corresponding to the magnitudes of the electric charges.

Each analog-to-digital converter $210_j$ includes: an integrating circuit $220_j$ having a charge amp $221_j$; a comparator circuit $230_j$; and a capacity control mechanism $240_j$.

The integrating circuit $220_j$ includes: the charge amp $221_j$; a variable capacity unit $222_j$; and a switch element $223_j$. The charge amp $221_j$ is for amplifying the charge of an input signal received from the horizontal photodetector row $110_j$. The variable capacity unit $222_j$ is connected, on one end, to the input terminal of the charge amp $221_j$, and is connected, on the other end, to the output terminal of the same. The switch element $223_j$ is connected, on one end, to the input terminal of the charge amp $221_j$, and is connected, on the other end, to the output terminal of the same. The switch element $223_j$ is turned ON or OFF in response to a reset signal R which is supplied from the image reading control portion 300, thereby toggling the operation of the integrating circuit $220_j$ between an integrating state and a not-integrating state.

Figure 5:
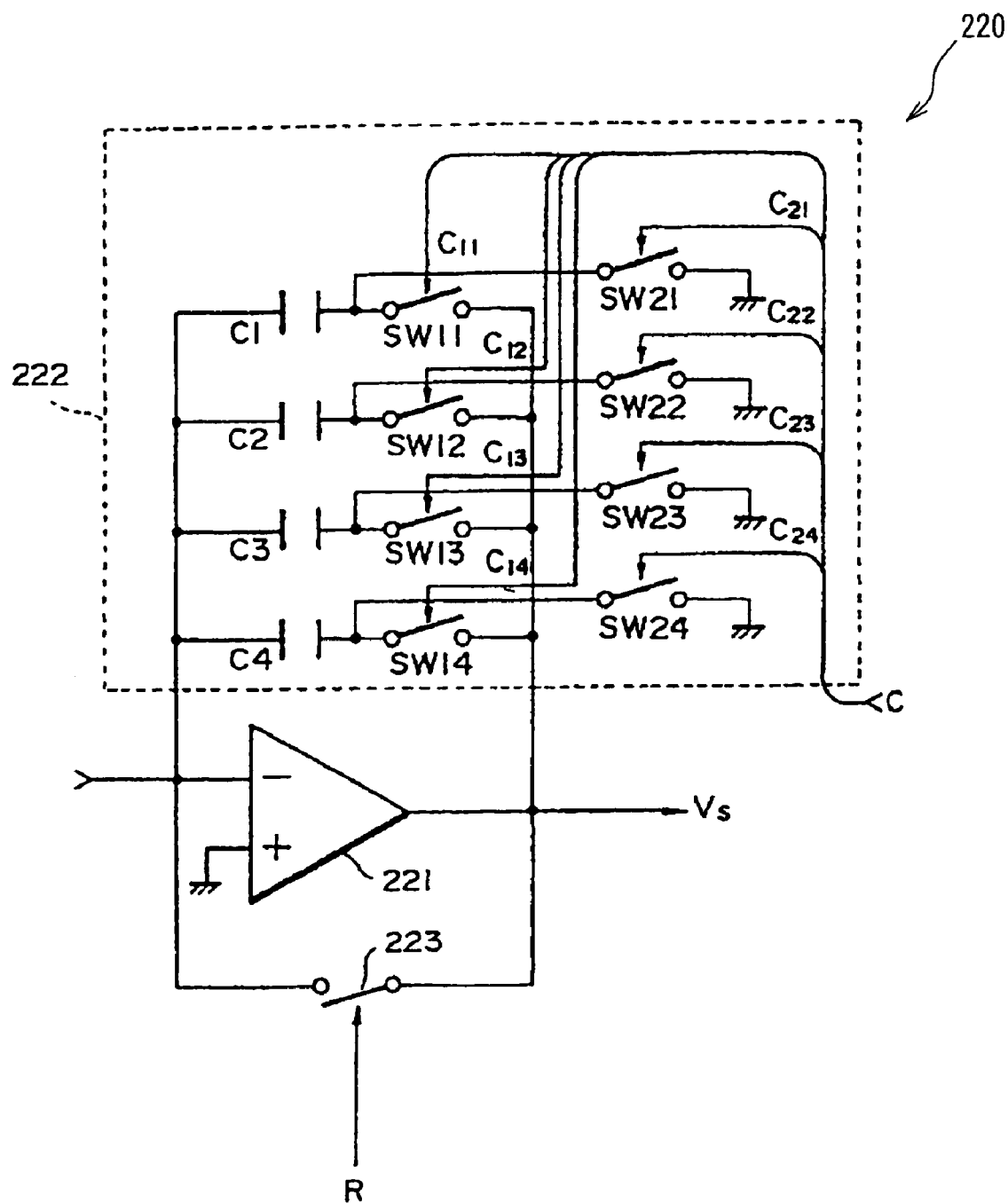
FIG. 5 is a detailed circuit diagram showing the integrating circuit in the analog-to-digital converter array of FIG. 4.

FIG. 5 shows a more detailed construction of the integrating circuit 220. This drawing shows one example of the integrating circuit that has an analog-to-digital converting function with a 4-bit (16 gradation) resolution. The integrating circuit 220 will be described below for this circuit structure.

The variable capacity unit 222 includes: capacity elements C1–C4; switch elements SW11–SW14; and other switch elements SW21–SW24. Each of the capacity elements C1–C4 is connected, on one end, to the input terminal of the charge amp 221 that receives signals outputted from the corresponding horizontal photodetector row 110. Each of the switch elements SW11–SW14 is connected between the other end of a corresponding capacity element C1–C4 and the output terminal of the charge amp 221. The switch elements SW11–SW14 are for opening and closing in response to capacity instructions signals $C_{11}$–$C_{14}$, respectively. Each of the switch elements SW21–SW24 has one terminal, which is connected between the corresponding capacity element C1–C4 and the corresponding switch element SW11–SW14, and another terminal, which is connected to a ground level GND. The switch elements SW21–SW24 are for opening and closing in response to capacity instructions signals $C_{21}$–$C_{24}$, respectively. The capacities $C_1$–$C_4$ of the capacity elements C1–C4 have the following relationships:

$$C_1 = 2C_2 = 4C_3 = 8C_4$$

$$C_0 = C_1 + C_2 + C_3 + C_4$$

Wherein $C_0$ is the maximum electrical capacity required by the integrating circuit 220. It is assumed that the saturation charge of the light receiving element 130 (see FIG. 4) is $Q_0$ and that a reference voltage is $V_{REF}$. In this case, the following relationship is satisfied:

$$C_0 = Q_0/V_{REF}$$

The remainder circuits in the analog-to-digital converter $210_j$ other than the integrating circuit $220_j$ will be described below while once again referring to FIG. 4. The comparator circuit $230_j$ is for comparing the value of an integral signal $V_S$, which is outputted from the integrating circuit $220_j$, with the reference voltage $V_{REF}$, and for outputting a comparison result signal $V_C$. Based on the value of the comparison result signal $V_C$, the capacity control mechanism $240_j$ outputs a capacity instruction signal C to notify the variable capacity unit $222_j$ in the integrating circuit $220_j$. The capacity control mechanism $240_j$ also outputs a digital signal D1 that corresponds to the capacity instruction signal C.

It is noted that the analog-to-digital converter array 13 has been described above for the case where the analog-to-digital converter array 13 has a 4-bit (16 gradation) resolution. However, the analog-to-digital converter array 13 can be configured to have a 6-bit, 8-bit, or other bit resolution.

The image reading unit 11, 13, having the above-described structure, is controlled in image reading timings by the image reading control portion 300 in the control circuit 15. As shown in FIG. 4, the image reading control portion 300 includes: a basic timing portion 310, a horizontal shift register 320, and a control signal portion 340. The basic timing portion 310 is for generating a basic timing to attain clock control of the entire circuits 11 and 13. The horizontal shift register 320 is for generating a horizontal scan signal $V_i$ according to a horizontal scan instruction inputted from the basic timing portion 310. The control signal portion 340 is for generating a reset instruction signal R.

Next, the structure of the parallel processing system 14 will be described.

As described already, as shown in FIG. 1, the parallel processing system 14 is provided with N2 shift register lines $420_j$ (j=1~N2) in correspondence with the N2 horizontal photodetector rows $110_j$ (j=1~N2) in the photodetector array 11 and in correspondence with the N2 analog-to-digital converters $210_j$ (j=1~N2) in the analog-to-digital converter array 13. In each shift register line $420_j$, N1 shift registers $410_{i,j}$ are connected in series. Each shift register $410_{i,j}$ has a plurality of bits (four (4) bits in this example). As shown in FIG. 6, the controller 15 is connected to each shift register $410_{i,j}$ (i=1~N1, j=1~N2) via the instruction/command bus 16. The controller 15 controls transfer of data from the analog-to-digital converter array 13 to the required position by outputting a transfer start signal to each shift register $410_{i,j}$.

In the parallel processing system 14, the processing elements $400_{i,j}$ (i=1~N1, j=1~N2) are arranged two-dimensionally in one to one correspondence with the N1×N2 photodetectors $120_{i,j}$ (i=1~N1, j=1~N2). Each processing element $400_{i,j}$ (i=1~N1, j=1~N2) is connected to a corresponding shift register $410_{i,j}$ (i=1~N1, j=1~N2) in a corresponding shift register line $420_j$ (j=1~N2). As shown in FIG. 6, the controller 15 is connected to each processing element $400_{i,j}$ via the instruction/command bus 16, and controls calculations executed by each processing element 400.

Next, the output bus 155 will be described.

As shown in FIG. 6, all the processing elements 400 are connected to the single output bus 155. The output bus 155 is constructed from a single one-bit signal line. Because the output bus 155 is connected to all the processing elements 400, the output bus 155 functions as a wired OR circuit for transmitting, to the control circuit 15, a logical OR value of outputs from all the processing elements 400. Accordingly, the control circuit 15 can receive output signals from all the processing elements 400 in such a state that the output signals are united together. The control circuit 15 can therefore receive the output signals immediately without performing scanning operation.

Next, the x-direction data bus 17 and the y-direction data bus 18 will be described.

It is noted that each of the x- and y-direction data buses 17 and 18 can be constructed from, for example, a one-directional data bus that has a function to transfer data only in a single direction from the control circuit 15 to the processing elements 400 and to write the data in the processing elements 400.

As shown in FIG. 1, the x-direction data bus 17 is constructed from a plurality of (N1, in this example) one-bit data lines 170$i$ ($1 \leq i \leq N1$). Each one-bit data line 170$i$ is connected to all of the N2 processing elements 400(i,j) ($1 \leq j \leq N2$) that are located on the corresponding processing element column i. Each one-bit data line 170$i$ is connected also to the control circuit 15 via the x-direction data buffer 19. With this structure, each one-bit data line 170$i$ transfers data, via the x-direction data buffer 19, from the control circuit 15 to all the processing elements 400 that are located on the corresponding column i.

Similarly, the y-direction data bus 18 is constructed from a plurality of (N2, in this example) one-bit data lines 180$j$ ($1 \leq j \leq N2$). Each one-bit data line 180$j$ is connected to all the N1 processing elements 400(i,j) ($1 \leq i \leq N1$) that are located on the corresponding processing element row j. Each one-bit data line 180$j$ is connected also to the control circuit 15 via the y-direction data buffer 20. With this structure, each one-bit data line 180$j$ transfers data, via the y-direction data buffer 20, from the control circuit 15 to all the processing elements 400 that are located on the corresponding row i.

Next, the structure of the processing elements 400 will be described in more detail with reference to the block diagram shown in FIG. 6.

The processing elements 400 are configured to perform SIMD-type parallel processing. In this type of parallel processing, all of the elements are controlled by common control signals. Accordingly, the number of transistors mounted in each element can be reduced, enabling higher integration in the parallel processing system 14 and enabling an increased number of elements.

More specifically, each processing element 400 includes a register matrix 401, an A-latch 402, a B-latch 403, and an arithmetic logic unit (ALU) 404. The register matrix 401 has 4×8 bits, and can be randomly accessed. The register matrix 401 is of a 1-bit shift type. The register matrix 401 is for performing both of data storage operation and data input/output operation. More specifically, the register matrix 401 in each processing element 400 is for receiving, from the corresponding shift register 410, a digital signal D1 that is equivalent to a signal outputted from a corresponding photodetector 120, and for storing it therein. The register matrix 401 in each processing element 400 is directly connected to the register matrices 401 in four adjacent processing elements 400 that are disposed adjacent to the subject processing element 400. The register matrix 401 can therefore receive digital signals that are stored in the register matrices 401 of the four neighboring processing elements and can store them therein. The register matrix 401 is connected further to a corresponding x-direction data line 170$i$ in the x-direction data bus 17 and to a corresponding y-direction data line 180$j$ in the y-direction data bus 18. The register matrix 401 can perform data transfer operation by using both of the data buses. The ALU 404 is for performing bit serial calculations to perform calculation one bit at a time beginning from the least significant bit. The A-latch 402 and the B-latch 403 are for receiving signals that are stored in the register matrix 401, and for supplying these signals to the ALU 404 for calculations.

In each processing element 400 having the above-described structure, the A-latch 402 and the B-latch 403 can read data from desired registers in the register matrix 401. The ALU 404 performs calculations based on the thus read data. The results of the calculations are written back to desired registers in the register matrix 401. The processing element 400 executes various calculations by repeatedly performing this operation cycle.

More specifically, the ALU 404 is a one-bit calculator that has functions for calculating a logical product (AND), a logical sum (OR), an exclusive or (XOR), an addition (ADD), a Carry-addition, and the like. Because the ALU 404 can process only one bit at a time, the ALU 404 can execute multi-bit calculations by performing a series of one-bit calculations. It is noted that complex calculations can be described by a combination of the above-described plural calculations. Accordingly, the ALU 404 performs complex calculations by repeatedly performing calculations each time selecting one function from these calculating functions available to be performed by the ALU 404. For example, multiplication can be described as a combination of additions. Therefore, the ALU 404 can perform multiplication by repeating adding functions a plurality of times. Subtraction can be implemented by first reversing the bits in the number to be subtracted, adding one (1) to make the value negative, and then performing adding operation. Division can be implemented by setting the divisor to a number, such as 8, 4, or 2, and shifting bits. (For example, the bits are shifted three places to the right if the divisor is 8.) An absolute value for a negative number can be calculated by reversing the sign of the negative number, whose sign bit is 1, that is, by reversing the bit and then adding one (1) to the result.

As shown in FIG. 7(A), in the register matrix 401, there are arranged: 24 one-bit registers 4010 and eight function registers 4012. The 24 one-bit registers 4010 can be randomly accessed. The eight function registers 4012 are for enabling input/output operations with external devices and with neighboring processing elements 400. All of these registers are treated as defining a single address space. The numbers appearing in the registers 4010 and 4012 in FIG. 6 indicate the addresses assigned to the corresponding registers. More specifically, the 24 registers 4010 are assigned addresses 0–23, while the eight function registers 4012 are assigned addresses 24–31. With this configuration, input/output data can be accessed in the same manner as reading data from and writing data into the registers.

As shown in FIG. 7(A), the register matrix 401 further includes one OR gate 4014, which is connected to all of these 32 registers 4010, 4012. All of the registers 4010 and 4012 are connected to the A-latch 402 and the B-latch 403 via the single OR gate 4014. When one address in the registers 4010 and 4012 is selected, only the selected register outputs its content, while all the remaining non-selected registers output zero (0). The result of the OR function on the values from all the registers is outputted to the A-latch 402 or the B-latch 403 as the output of the entire register matrix 401.

The function registers 4012 are mainly used for performing input and output operations. More specifically, the function register 4012 at address 29 is connected to a corresponding shift register 410, and is used for inputting data from the shift register 410. The function register 4012 at address 24 is used for outputting data to register matrices 401 of four neighboring processing elements 400 that are located on all the four sides of up, down, left, and right, respectively, of the subject processing element 400. The function register 4012 at each of the addresses 24–27 is used for inputting data from a register matrix 401 of a corresponding one of the four neighboring processing elements 400. The function register 4012 at address 28 is connected to the output bus 155, and is used as an output address to the control circuit 15. It is noted that the addresses 28 of the register matrices 401 in all the processing elements 400(i,j) are connected to the single output bus 155. The function register 4012 at address 30 is connected to a corresponding y-direction data line 180j in the y-direction data bus 18, and is used for inputting data from the y-direction data line 180j. The function register 4012 at address 31 is connected to a corresponding x-direction data line 170i in the x-direction data bus 17, and is used for inputting data from the x-direction data line 170i. It is noted that the function register 4012 at address 28 is configured to always read zero (0) when it is used to read data.

The control circuit 15 controls accesses to the register matrix 401 and calculations by the ALU 404, thereby controlling the entire processes of calculations and input/output operations of the processing element 400. In order to write data, inputted from the shift register 410, to address zero (0) in the register matrix 401, for example, the control circuit 15 outputs, to the processing element 400, an instruction to calculate the logical OR of 0 (register address 28) and the sensor input (register address 29) and then to write the calculated result to register address (0). It is noted that as shown in FIG. 7(B), the control circuit 15 sets one cycle of operation to the value four times as long as a basic clock CLK. While providing various clocks CLK2, CLK4, the control circuit 15 successively performs control operation to read data into A-latch, to read data into B-latch, and to write the result of calculation into the register matrix. By performing this process repeatedly over a plurality of cycles, it is possible to attain required inputting/outputting operation with the register matrix 401 and to attain calculations at the ALU 404.

Next, the operations of the present embodiment will be described with reference to FIGS. 4–6.

First, the operations of the image reading portion 11, 13 will be described.

First, the image reading control portion 300 sets the reset signal R to enabled, and sets all of the switches SW11–SW14 in the variable capacity unit 222 of FIG. 5 to ON and sets all the switches SW21–SW24 to OFF. With this operation, the capacity between the input and output terminals of the charge amp 221 is set to $C_0$. At the same time, all the switch elements 140 shown in FIG. 4 are set to OFF, and the horizontal scan signal $V_i$ is set to a state that does not select any photodetectors $120_{i,j}$. From this state, the reset signal R is set to disabled, and each integrating circuit 220 is controlled to start integration operations.

After starting the integration operation, a horizontal scan signal $V_1$ is outputted for setting, to ON, only the switch element 140 in the first photodetector $120_{1,j}$ among the photodetectors in each of the N2 horizontal photodetector rows $110_j$ shown in FIG. 4. When the switch element is thus turned ON, a charge $Q_1$, which has been accumulated in the photoelectric conversion element 130 in response to light received until present, is outputted as a current signal from the photodetector array 11. Thus, a signal is read from the photoelectric conversion element. The charge $Q_1$, then flows to the variable capacity unit 222, which is now being set at capacity $C_0$.

Next, the internal operations of the integrating circuit 220 will be described with reference to FIG. 5. The capacity control mechanism 240 (FIG. 4) opens switches SW12–SW14, and then closes the switches SW22–SW24. As a result, the integral signal $V_S$ is outputted to have the following voltage value:

$V_s = Q/C_1$

The integral signal $V_S$ is inputted into the comparator circuit 230, and is compared with the reference voltage $V_{REF}$. If the difference between the integral signal $V_S$ and the reference voltage $V_{REF}$ is within the range of resolution, that is, lower than or equal to $\pm C_4/2$, then the integral signal $V_S$ is determined to match the reference voltage $V_{REF}$. In this case, no further capacity control is performed and the integral operation ends. On the other hand, if the difference does not fall within the range of resolution, then further capacity control will be performed to continue the integral operation. For example, if $V_S$ is greater than $V_{REF}$, the capacity control mechanism 240 opens the switch SW22 and subsequently closes the switch SW12. As a result, the integral signal $V_S$ changes to have the following voltage value:

$V_S = Q/(C_1 + C_2)$

This integral signal $V_S$ is inputted into the comparator circuit 230 (FIG. 4) and is compared with the reference voltage $V_{REF}$. On the other hand, if $V_S$ is smaller than $V_{REF}$, then the capacity control mechanism 240 opens both switches SW11 and SW22 and subsequently closes the switches SW12 and SW21. As a result, the integral signal $V_S$ changes to have the following voltage value:

$V_S = Q/C_2$

This integral signal $V_S$ is outputted to the comparator circuit 230 to be compared with the reference voltage $V_{REF}$.

By repeating this feedback loop among the integrating circuit 220, the comparator circuit 230, the capacity control mechanism 240, and back to the integrating circuit 220, comparison operation and capacity setting operation (that is, control of the ON/OFF settings of the switches SW11–SW14 and SW21–SW24) are repeated until the integral signal $V_S$ matches the reference voltage $V_{REF}$ within the resolution range. The values of the capacity instructions signals $C_{11}$–$C_{14}$, which indicate the ON/OFF states of the switches SW11–SW14 at the time when the integration operations are ended, constitute a digital signal that corresponds to the charge $Q_1$, wherein the most significant bit (MSB) of the digital signal is the value of $C_{11}$, while the least significant bit (LSB) is the value of $C_{14}$. The input signal is thus analog-to-digital converted into the digital signal, and the digital signal is outputted as a digital signal D1 to the processing element array 14. As described above, the present apparatus successively determines the values of the respective bits in the digital signal D1 one bit at a time from the MSB to the LSB.

Hence, according to the present embodiment, the integral signal $V_S$ is repeatedly compared with the reference voltage $V_{REF}$, while the capacity elements C1–C4 are successively turned ON one at a time. The comparison result is outputted as a digital signal D1. More specifically, C1 is first set to ON, thereby making integral signal $V_S$ equal to Q/C1. This integral signal $V_S$ is compared with the reference voltage $V_{REF}$. A one (1) is outputted as the MSB (most significant bit) if the integral signal $V_S$ is larger than the reference voltage $V_{REF}$. A zero (0) is outputted as the MSB (most significant bit) if the integral signal $V_S$ is smaller than the reference voltage $V_{REF}$. Next, C2 is set to ON, making the integral signal $V_S$ be equal to Q/(C1+C2) when MSB=1, or the integral signal $V_S$ be equal to Q/C2 when MSB=0. This integral signal $V_S$ is compared to the reference voltage $V_{REF}$. A one (1) is outputted as the second bit if the integral signal $V_S$ is larger than the reference voltage $V_{REF}$. A zero (0) is outputted as the second bit if the integral signal $V_S$ is smaller than the reference voltage $V_{REF}$. Analog-to-digital conversion is executed by repeating the above-described process the number of times that is equal to the number of bits required.

When output of a digital signal equivalent to the photoelectric output from the first photodetector $120_{1,j}$ is completed, the reset signal R is enabled. The reset signal is then disabled again, and the capacity value of the variable capacity unit $222_j$ is initialized. Subsequently, a horizontal scan signal $V_2$ is outputted for turning ON the switch element 140 only in the second photodetector $120_{2,j}$ in each row $110_j$. Then, the above-described process is performed again for reading the photoelectric output from the second photodetector $120_{2,j}$ and for outputting a corresponding digital signal. Hereafter, by successively changing the horizontal scan signal $V_i$, photoelectric outputs are read successively from all the photodetectors 120, and corresponding digital signals are outputted to the parallel processing system 14.

Next, the operations of the processing elements 400 will be described with reference to FIG. 6.

The digital signal of the output from each photodetector $120_{i,j}$, which is produced by the analog-to-digital conversion, is transmitted to the register matrix 401 of a corresponding processing element $400_{i,j}$ via the shift registers 410. This transmission process is executed, in the corresponding shift register line 420, by transferring the digital signal successively from the shift register 410 at one pixel to the shift register 410 at the next pixel. Because the shift registers 410 are provided in the present embodiment, signal transmission operation by the shift registers can be performed independently from the calculation processing performed by the processing elements 400. Accordingly, it is possible to perform a pipeline process to control the shift registers 410 to transmit next data while controlling the processing elements 400 to perform calculation processing onto present data. It is therefore possible to perform calculations at the processing elements 400 at a higher frame rate. It is noted that the shift registers 410 begin transferring the analog-to-digital converted data in response to a transfer start signal, which is sent from the control circuit 15. The shift registers 410 return a "data transfer complete" signal to the control circuit 15 after performing bit-shifting transfer operation by the number of bits that is equal to the product of the total number of elements in a row and the number of bits of analog data levels. Thus, an efficient transmission operation can be attained. Hence, according to the present embodiment, the pipeline process can be executed by performing the calculation processes and the transmission processes in parallel. It is possible to reduce the amount of wait time between the calculation processes and the transmission processes in successive frames, thereby achieving faster image processing.

The image process calculations are conducted in the processing elements 400 as described below. Signals stored in the register matrices 401 of the respective processing elements 400 are transmitted to other processing elements 400 when required. Data and control signals are transferred from the control circuit 15 to the processing elements 400 via the x-direction data bus 17, the y-direction data bus 18, and the buffers 19 and 20. Thereafter, in each processing element, signals for calculations are read from the register matrix 401 into the A-latch 402 and the B-latch 403. Predetermined calculation is achieved in the ALU 404. The calculated result is outputted via the register matrix 401 and the output bus 155 to the control circuit 15.

It is noted that in the parallel processing system 14, the above-described image processing calculations are performed simultaneously by all the processing elements 400 in a parallel processing manner. Accordingly, calculation can be performed at an extremely high rate of speed. The control circuit 15 outputs the results of calculations, which are obtained by the parallel processing system 14, to the external device 1000 such as an external computer or other external equipments. For example, the results of calculations obtained by the parallel processing system 14 can be used as ON/OFF signals for an external equipment. The control circuit 15 may perform required calculations based on the results of calculations obtained by the parallel processing system 14, and then output the calculated results to the external circuit 1000.

Next, a series of vision sensor processes performed by the present vision sensor 10 will be described with reference to FIG. 8. This series of processes covers the image input process and the image transmission process up through the completion of the calculation process.

The CPU 150, in the control circuit 15, controls in S101 the image reading control portion 300 (see FIG. 4) thereby successively switching the reset signal R between the enabled condition and the disabled condition and successively switching the horizontal scan signal $V_i$. As a result, in each row j (j=1, . . . , N2) of the photodetector array 11, image data (frame data; hereinafter referred to as I(x, y)), which is outputted from the photodetectors $120_{i,j}$ (hereinafter referred to as photodetectors 120 (x, y)), is successively inputted into the parallel processing system 14 via the corresponding analog-to-digital converter $210_j$.

In S102, in each row j, data inputted from the analog-to-digital converter $210_j$ is transmitted in succession via the corresponding shift registers 410. This transfer process continues in S103 until image data from each photodetector 120 reaches the shift register $410_{i,j}$ at the corresponding position (i, j) (hereinafter referred to as (x, y)).

After transmission has been completed, in S104, data I(x, y) of each pixel is transferred from the corresponding shift register 410 to the register matrix 401 of the corresponding processing element $400_{i,j}$ (hereinafter referred to as processing element 400(x, y)). As shown in FIG. 6, data in the shift register 410 is composed of a plurality of bits (four bits in this example). Accordingly, data is transferred from the shift register 410 one bit at a time into the register matrix 401. In S110, each processing element 400 is controlled to perform necessary image processing.

When each shift register 410 completes transferring data to the corresponding processing element 400, while each processing element 400 is controlled to perform calculation processes in S110, each shift register 410 continues to the process of the next frame in S105, and the processes of S101–S103 are executed again. That is, the photodetector array 11, the analog-to-digital converter array 13, and the transfer shift registers 410 are controlled to perform input/transfer operation for the next frame. With respect to the parallel processing performed by the processing elements 400, after the processing for one frame (S110) is completed, each processing element 400 advances to the next frame process in S106. As a result, image data for the next frame is transmitted in S104 from each shift register 410 to the register matrix 401 of the corresponding processing element 400. Then, the parallel processing for the next frame is started in S110. By repeating the above-described processes, while the photodetector array 11, the analog-to-digital converter array 13, and the transfer shift registers 410 input and transfer data for the next frame in S101–S103, the processing elements 400 can perform the calculation process onto the present frame data in S110, thereby reducing wasteful wait time.

Next, the parallel image processing operations of the processing elements 400 executed in S110 will be described in detail with reference to several examples of the image processings. During the image processing procedure, the CPU 150 in the control circuit 15 performs parallel-control onto all the processing elements 400 simultaneously, thereby achieving calculation processings very rapidly.

EXAMPLE 1

According to the present embodiment, calculation data and calculation-control data can be supplied to each processing element within a short period of time via the x-direction data bus 17 and the y-direction data bus 18 from outside. Accordingly, calculation can be attained at a high speed even when each processing element 400 performs in S110 a type of calculation that requires additional data other than image information. For example, in order to calculate the center of gravity of the input image during the image processing step (S110), the processing elements require positional information data. Accordingly, positional data is supplied from outside to the processing elements, which in turn calculate the center of gravity. Next will be described in detail the operation performed when the center of gravity is calculated during the image processing procedure (S110).

It is noted that the memory 151 in the control circuit 15 previously stores therein x-direction positional information (which will be referred to simply as "x address" hereinafter) and y-direction positional information (which will be referred to simply as "y address" hereinafter) of each pixel. In more concrete terms, the memory 151 stores, as x-address, binary number data indicative of "1"-"N1", and stores, as y-address, binary number data indicative of "1"-"N2".

The processing for calculating the center of gravity is based on a calculation of a weighted sum in each of x- and y-directions. The center of gravity Gc of an image is determined by calculating the following formula (1) with respect to image intensity data I(x,y) at each pixel position (x,y) of the subject image:

$$G_c = \left( \frac{\sum_{y=1}^{N2} \sum_{x=1}^{N1} \{I(x, y) \times x\}}{\sum_{y=1}^{N2} \sum_{x=1}^{N1} I(x, y)}, \frac{\sum_{y=1}^{N2} \sum_{x=1}^{N1} \{I(x, y) \times y\}}{\sum_{y=1}^{N2} \sum_{x=1}^{N1} I(x, y)} \right) \quad (1)$$

That is, in order to calculate the center of gravity, each processing element 400 has to multiply its image data I (x,y) by its positional information (x,y). The multiplied results obtained on the plural processing elements 400 are added together. Accordingly, when it is desired to calculate the center of gravity, pixel positional information (x,y) is transferred, in advance, to each processing element.

In order to calculate an x-coordinate of the center of gravity of an image, an x-directional moment "x·I(x,y)" is first calculated by multiplying image intensity I(x,y) with x-directional positional information. Then, an x-directional moment sum "ΣΣx·I(x,y)" is calculated by adding together the x-directional moments of all the pixels. The x-coordinate of the center of gravity is calculated by dividing the x-directional moment sum "ΣΣx·I(x,y)" by an image intensity sum "ΣΣI(x,y)". It is noted that the image intensity sum "ΣΣI(x,y)" is calculated by adding image intensities of all the pixels. Similarly, in order to determine a y-coordinate of the center of gravity of the image, a y-directional moment "y·I(x,y)" is first calculated at each pixel by multiplying the image intensity I(x,y) by the y-directional positional information. Then, a y-directional moment sum "ΣΣy·I(x,y)" is calculated by adding together the y-directional moments of all the pixels. The y-coordinate of the center of gravity is calculated by dividing the y-directional moment sum "ΣΣy·I(x,y)" by the image intensity sum "ΣΣI(x,y)".

Figure 8:
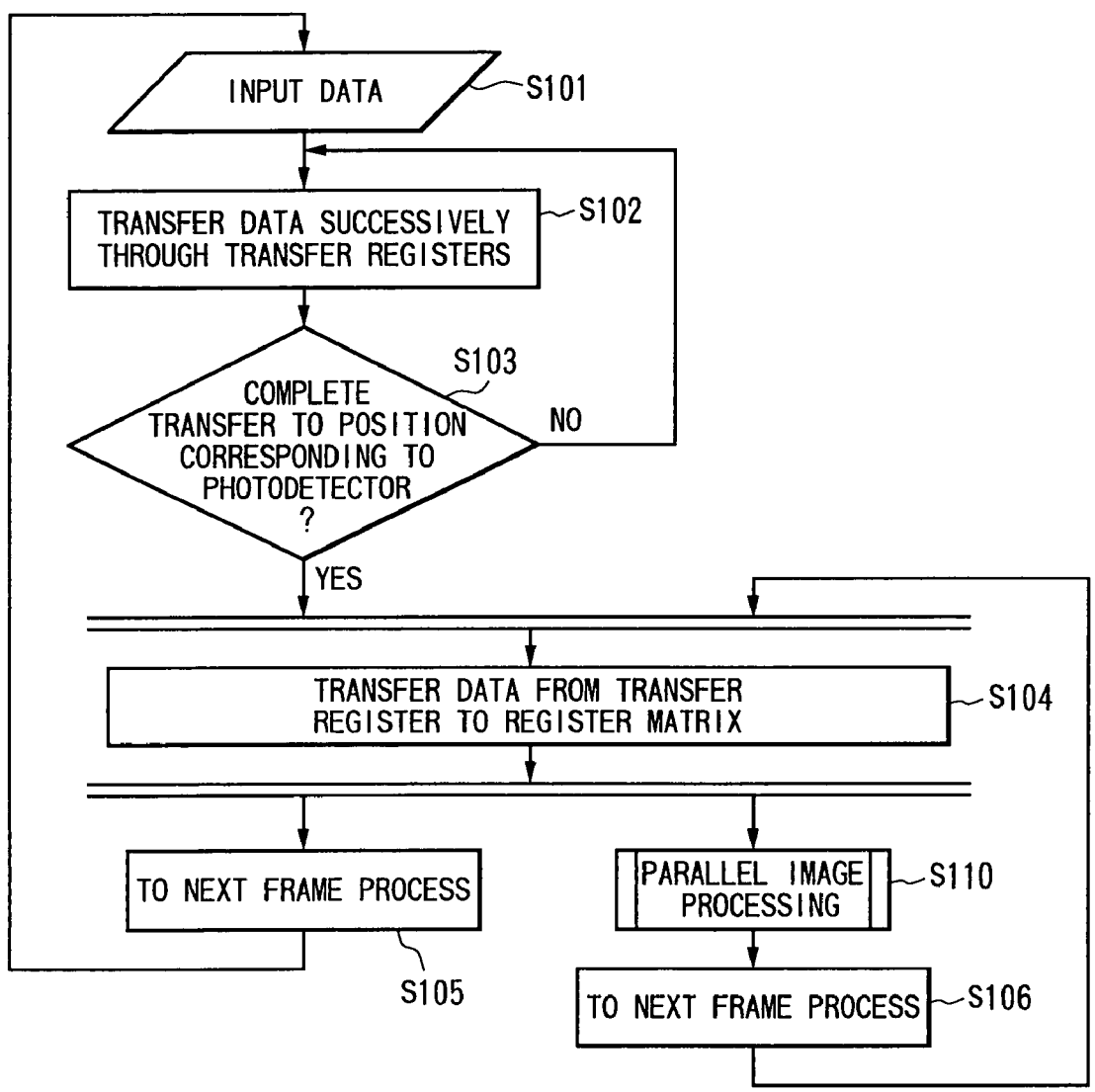
FIG. 8 is a flowchart showing the operation of the high-speed vision sensor of the embodiment.
Figure 9:
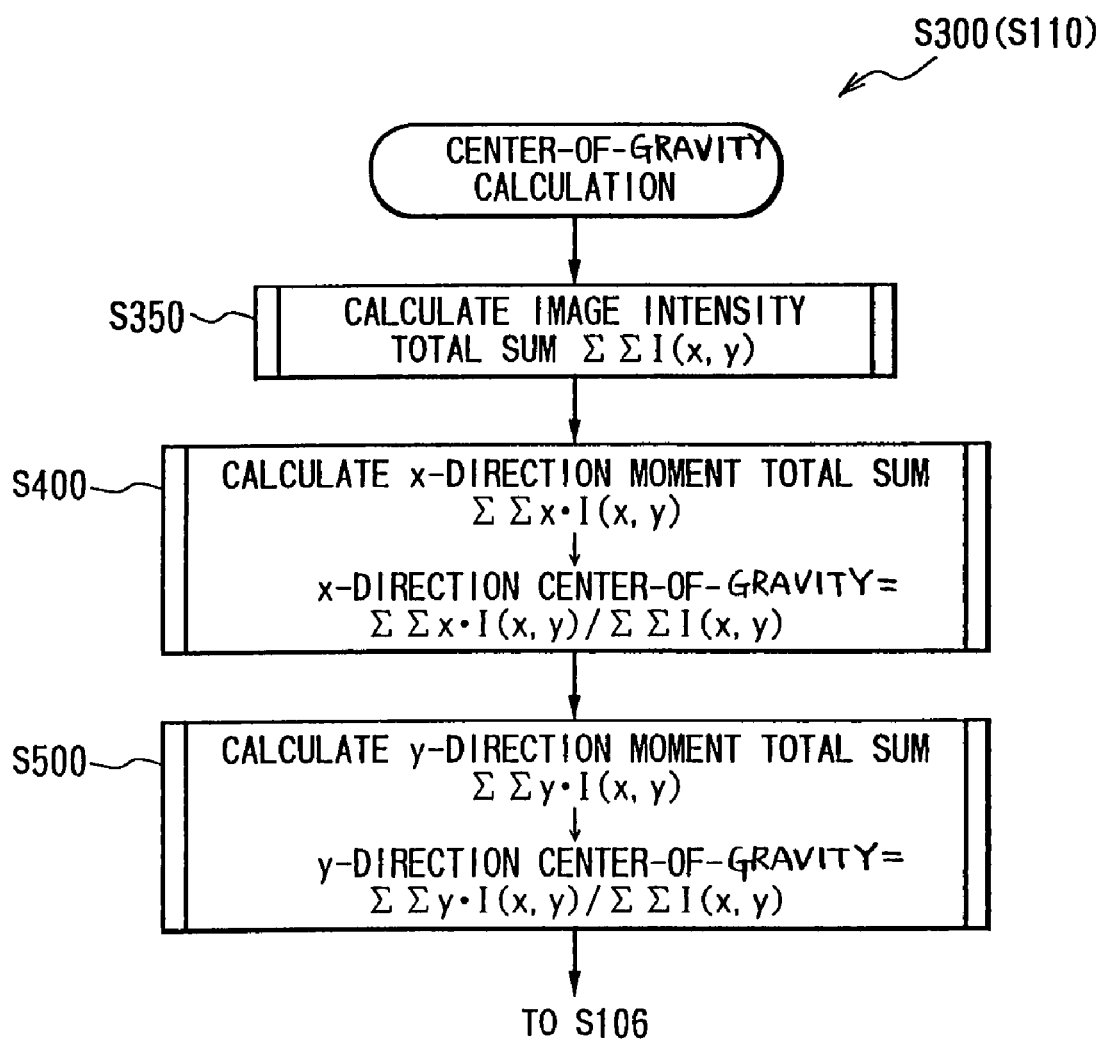
FIG. 9 is a flowchart of a center of gravity calculating process, which is one example of a step S110 in FIG. 8.
Figure 10:
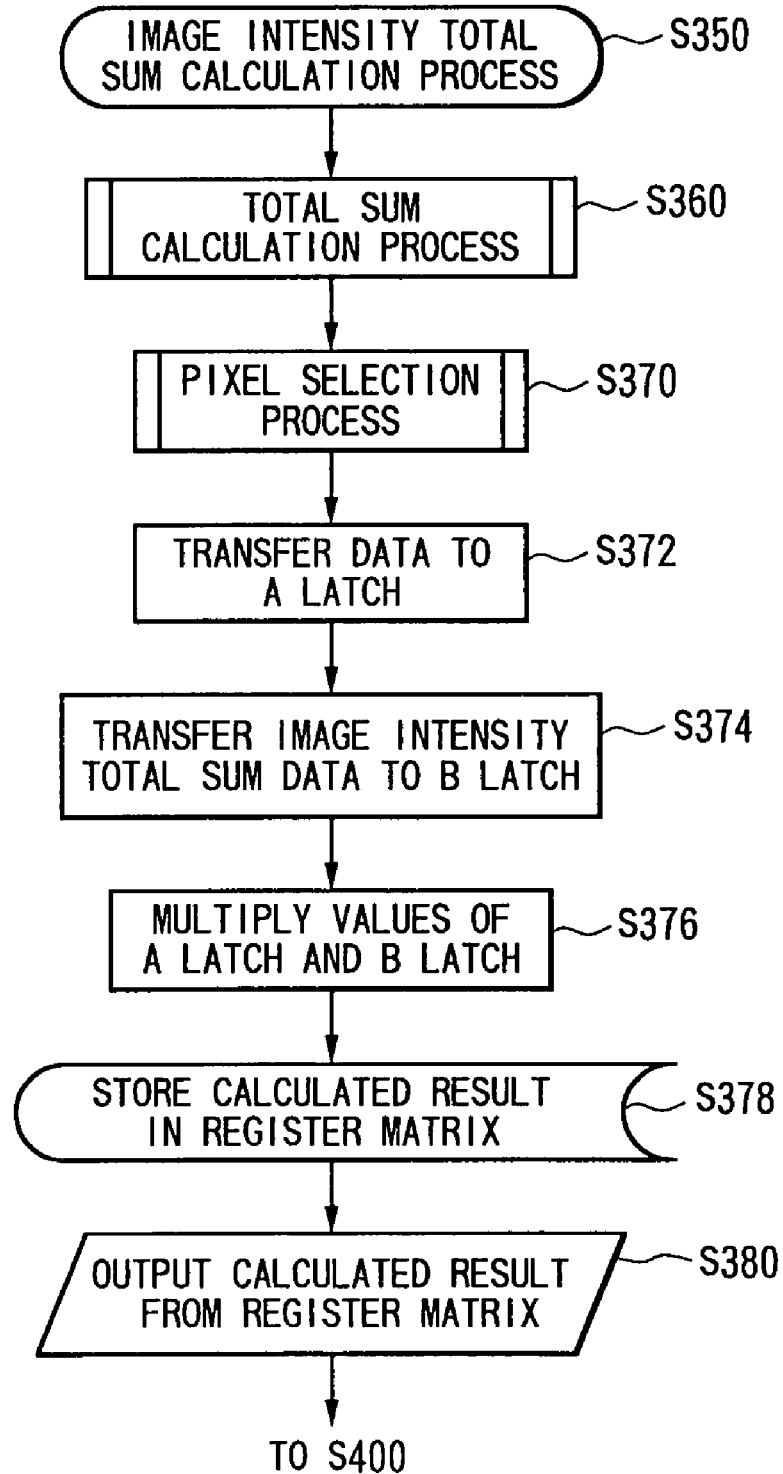
FIG. 10(A) is a flowchart of an image intensity total sum calculation process in the center of gravity calculating process of FIG. 9.
FIG. 10(B) is a flowchart of a total sum calculating process in the image intensity total sum calculation process of FIG. 10(A)
FIG. 10(C) is a flowchart of a pixel selection process in the image intensity total sum calculation process of FIG. 10(A)
Figure 10:
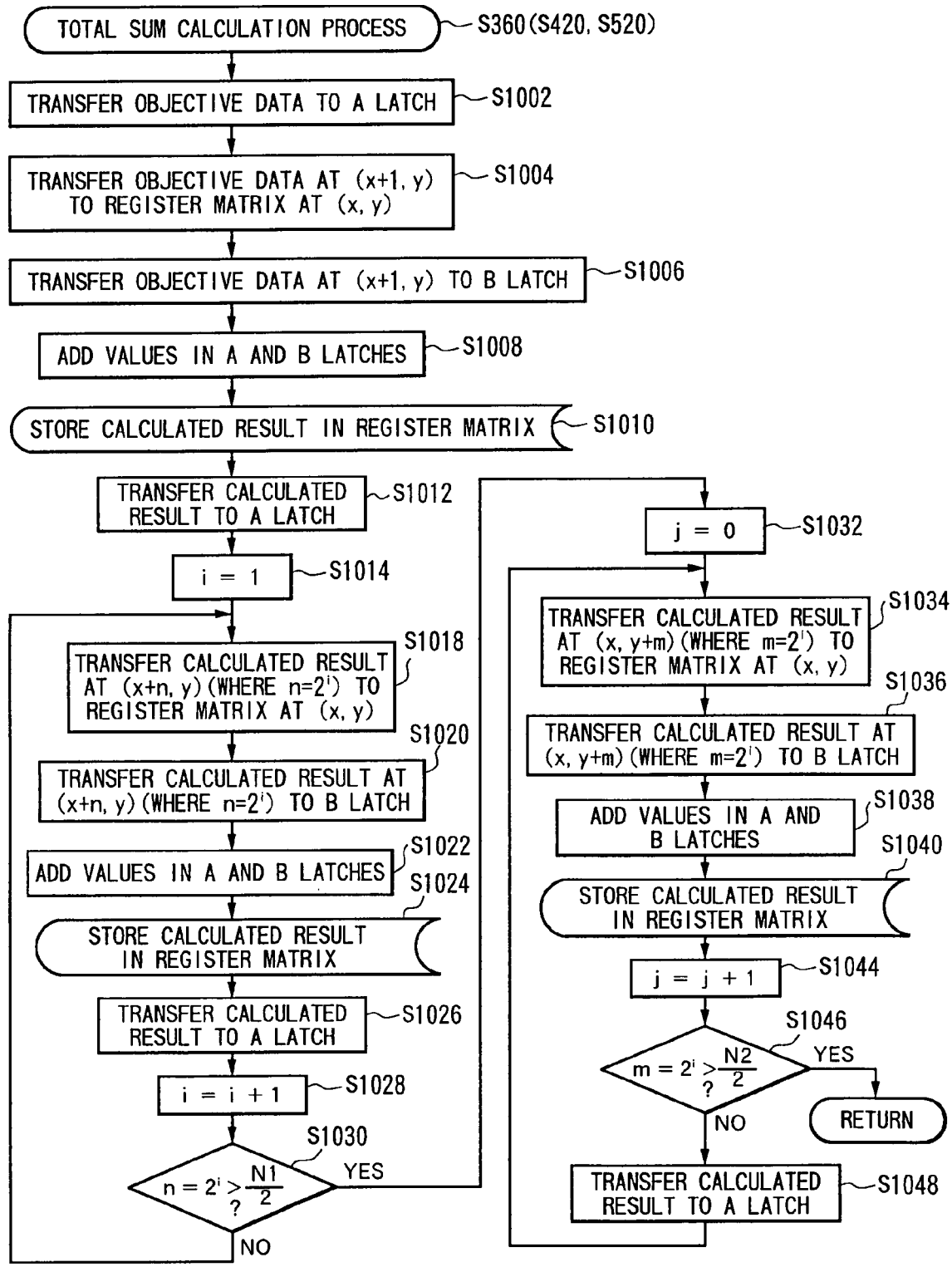
Figure 10:
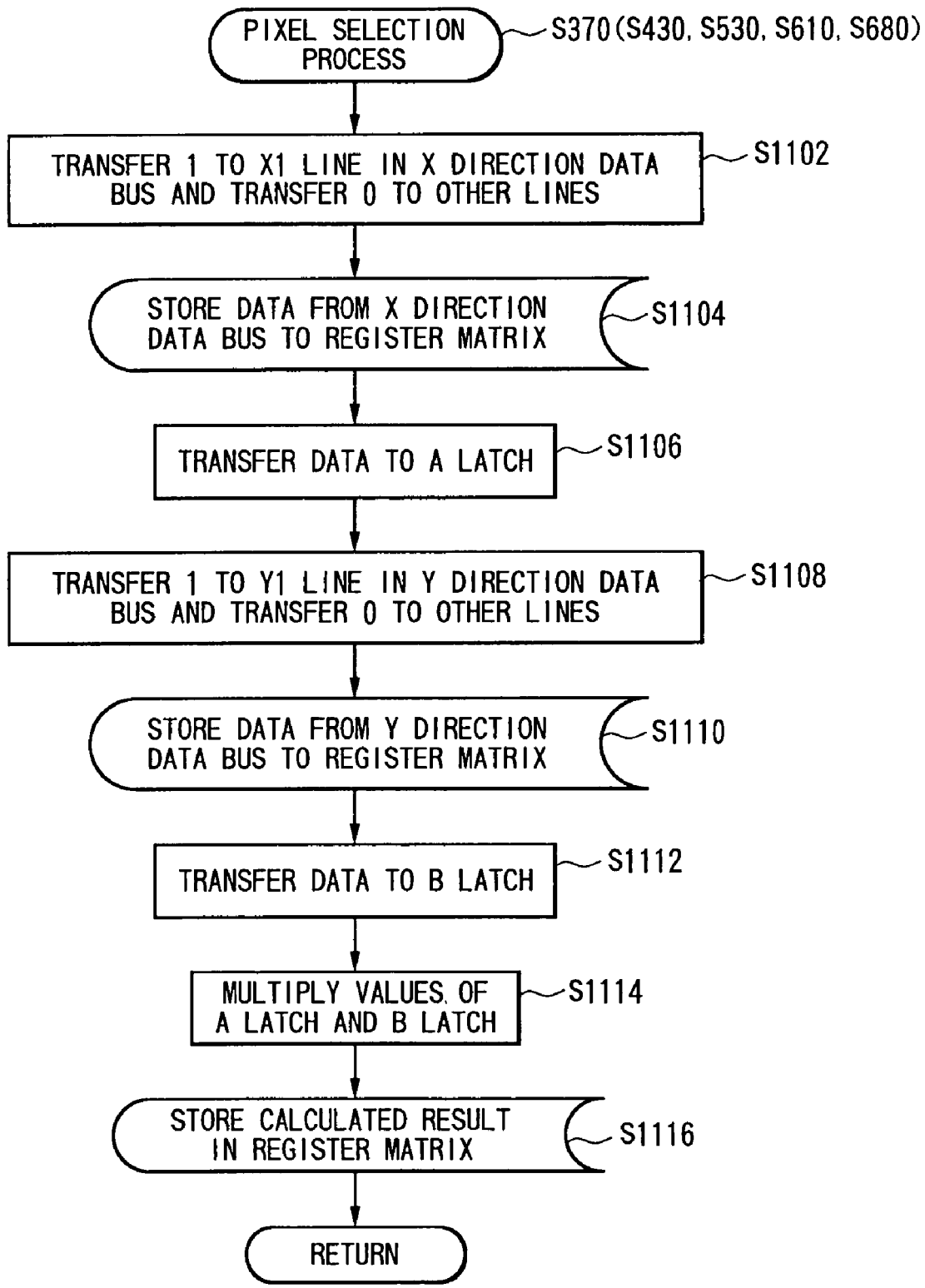

Accordingly, in order to determine the position of the center of gravity of an input image, it is preferable to execute the center of gravity calculation processes (S300) shown in FIG. 9, during the image processing step S110 (FIG. 8).

During the center of gravity calculation processes (S300), first, the image intensity sum ΣΣI(x,y) is calculated in S350. Next, in S400, the x-coordinate of the center of gravity is calculated. Thereafter, in S500, the y-coordinate of the center of gravity is calculated.

It is noted that when the calculation process for the center of gravity (S300) is started, image data I(x,y) at each pixel of an input image D has already been transferred in S104 (FIG. 8) to the register matrix 401 of the corresponding pixel 400(x,y) via the corresponding transfer shift register 410, and is being stored in some region of the register matrix 410.

First, the process (S350) of calculating the image intensity sum ΣΣI(x,y) will be described with reference to FIG. 10(A).

During the image intensity sum calculation process (S350), the CPU 150 first performs in S360 a sum calculation process for determining the total sum of the image intensities I(x,y).

The sum calculation process (S360) will be described with reference to FIG. 10(B).

First, in S1002, objective data (in this example, image data I(x,y), for which a sum is desired to be determined) is read from the register matrix 401 to the A latch 402. That is, data I(x,y) is transferred from its least significant bit from the register matrix 401 to the A latch 402. Next, in S1004, data transfer is performed between neighboring register matrices 401 so that each processing element 400(x,y) receives objective data (in this example, I(x+1, y)) from another processing element 400(x+1, y) that is located at a pixel position (x+1, y) adjacent to the subject pixel location (x,y) in the x direction. The processing element 400(x,y) stores therein the received objective data. More specifically, by using the transfer function of the register matrix of each pixel with its neighboring register matrix, an image data value is transferred to a vacant region in the register matrix of each pixel from the register matrix of the neighboring pixel. Next, in S1006, the objective data (image data I(x+1, y)), which has been transferred from the neighboring pixel (x+1, y), is read into the B latch 403. In S1008, data in A latch 402 and data in B latch 403 are added together. The added result is stored in the A latch 402 via the register matrix 401 in S1010 and in S1012. In this way, each pixel 400(x,y) stores therein a sum of the objective data of two adjacent pixels (in this example, a sum of image data I(x,y) and I(x+1, y)).

Next, in S1014, the CPU 15 initially sets one (1) to a variable i, which will be used to calculate a sum in the x direction. In S1018, transfer between neighboring register matrices in x direction is performed twice so that each processing element 400(x,y) receives a calculated result (in this case, I(x+2, y)+I(x+3, y)) that is stored in another processing element 400(x+2, y) that is located at a position (x+n, y) (where n=$2^i$: in this case, n=$2^1$=2) second closest to the subject pixel position in the x direction. The processing element 400(x,y) stores therein the received calculated result. Next, the calculated result data, which has been transferred from the second closest pixel (x+2, y), is read into the B latch 403 in S1020. Data in the A latch 402 and the data in the B latch 403 are added together in S1022. The added result is stored in the A latch 402 via the register matrix 401 in S1024 and in S1026. As a result, each pixel 400(x,y) stores a sum of image data I(x,y), I(x+1, y), I(x+2, y), and I(x+3, y) of four neighboring pixels.

Next, i is incremented by one (1) in S1028. It is judged in S1030 whether the obtained value n=$2^i$ exceeds a half N1/2 of the total number of pixels in each row. When the obtained value n=$2^i$ does not exceed the value N1/2 (no in S1030), the program returns to S1018. In S1018, transfer between neighboring register matrices in x direction is performed n times (in this example, four times) so that each processing element 400(x,y) receives a calculated result (image data-added result) that is stored in another processing element 400 that is located at a position (x+n, y) (where n=$2^i$, in this case, n=$2^2$=4) that is n-th closest to the subject pixel position in the x direction. The transferred data is read into the B latch 403 in S1020. Adding operation the same as described above is performed in S1022–S1026.

Next, while successively incrementing i by one (S1028), the processings of S1018–S1030 are repeated. Thus, addition is repeated through the eighth (n=$2^3$) neighboring pixel, the sixteenth (n=$2^4$) neighboring pixel, the 32-th (n=$2^5$) neighboring pixel, the 64-th (n=$2^6$) neighboring pixel, ... up to the (N1/2)-th neighboring pixel. As a result, in S1026, the added result I(1,y)+I(2,y)+ ... +I(N1,y) is obtained in the A latch 402 of a processing element 400(1,y) that is located at a leading edge of the subject row. When n exceeds the value N1/2 (yes in S1030), the program proceeds to S1032.

During the processes downstream from S1032, the image intensity sums, which are obtained at the respective rows, are added together in a similar manner as described above. As a result, the image intensity sum ΣΣI(x,y), which is a denominator of the formula (1), is obtained.

More specifically, j is initially set in S1032 to zero (0). In S1034, transfer between neighboring register matrices in y direction is performed so that each processing element 400(x,y) receives an added result that is stored in another processing element 400(x, y+m) that is located at a position (x, y+m) (where m=$2^j$, in this case, n=$2^j$=1) adjacent to the subject pixel position in the y direction. The processing element 400(x,y) stores the received added result. Next, the calculated result data, which has been transferred from the adjacent pixel (x, y+1), is read into the B latch 403 in S1036. Data in the A latch 402 and the data in the B latch 403 are added together in S1038. The added result is stored in the register matrix 401 in S1040. As a result, the processing element 400(1,y) at a leading edge of each row stores a sum of results calculated at two rows.

Next, j is incremented by one (1) in S1044. It is judged in S1046 whether the obtained value m=$2^j$ exceeds a half N2/2 of the total number of pixels in each column. When the obtained value m=$2^j$ does not exceed the value N2/2 (no in S1046), the added result obtained in S1038 is transferred from the register matrix 401 to the A latch 402 in S1048. Thereafter, the program returns to S1034.

Next, in S1034, transfer between neighboring register matrices in y direction is performed twice so that each processing element 400(x,y) receives an added result that is stored in another processing element 400 that is located at a position (x, y+m) (where m=$2^j$, in this case, position (x, y+2)) that is second closest to the subject pixel position in the y direction. The transferred data is read into the B latch 403 in S1036. Adding operation the same as described above is performed in S1038–S1040.

Next, while successively incrementing j by one (S1044), the processings of S1046–S1040 are repeated. Thus, addition is repeated through the fourth (m=$2^2$) neighboring pixel, eighth (m=$2^3$) neighboring pixel, the sixteenth (m= $2^4$) neighboring pixel, the 32-th (m=$2^5$) neighboring pixel, the 64-th (m=$2^6$) neighboring pixel, ... up to the (N2/2)-th neighboring pixel. As a result, in S1040, the total sum ΣΣI(x,y) of the image intensities of all the pixels is obtained in the register matrix 401 of the processing element 400(1,1) at the leading end of the processing element array 40. When m exceeds the value N2/2 (yes in S1046), the total sum calculation process is ended.

When the total sum calculation process (S360) is completed, as shown in FIG. 10(A), the program proceeds to a pixel selection process (S370) to select an objective pixel position (x1, y1) (the leading end pixel position (1, 1) in this case).

Next, the pixel selection process (S370) will be described with reference to FIG. 10(C).

During the pixel selection process, first, in S1102, the CPU 150 transfers data (1) to an x-direction data line 170*i* (which will be referred to as "x-direction data line 170*x*" hereinafter), among the x-direction data bus 17, that corresponds to the x address x1 of the objective pixel position (x1, y1) to be selected. The CPU 150 transfers data (0) to all the remaining x-direction data lines 170*x*. In this case, the CPU 150 transfers data (1) to an x-direction data line 170*x* (x=x1=1) that corresponds to the x address x1 of the leading end pixel position (x1 (=1), y1 (=1)) to be selected. The CPU 150 transfers data (0) to all the other remaining x-direction data lines 170*x* (x≠x1).

Next, in S1104, each processing element 400(x,y) is controlled to store, into its register matrix 401, data that is transferred from the corresponding x direction data line 170*x*. As a result, among all the processing elements 400, the register matrices 401 at the processing elements 400(1,y) (1≦y≦N2), whose x addresses are x1 (=1), are stored with data (1). The register matrices in the other remaining processing elements 400 are stored with data (0). Next, the thus stored data is transferred to A latch 402 in S1106.

Next, in S1108, the CPU 150 transfers data (1) to a y-direction data line 180*j* (which will be referred to as "y-direction data line 180*y*" hereinafter), among the y-direction data bus 18, that corresponds to the y address y1 of the objective pixel position (x1, y1). The CPU 150 transfers data (0) to all the other remaining y-direction data lines 180*y*. In this case, the CPU 150 transfers data (1) to a y-direction data line 180*y* (y=y1=1) that corresponds to the y address y1 of the leading end pixel position (x1 (=1), y1 (=1)) to be selected. The CPU 150 transfers data (0) to all the other remaining y-direction data lines 180*y* (y≠y1).

Next, in S1110, each processing element 400(x,y) is controlled to store, into its register matrix 401, data transferred from the corresponding y direction data line 180*y*. As a result, among all the processing elements 400, the register matrices 401 at the processing elements 400(x,1) (1≦x≦N1), whose y addresses are y1 (=1), are stored with data (1). The register matrices in the other remaining processing elements 400 are stored with data (0). Next, the thus stored data is transferred to B latch 403 in S1112.

Next, in S1114, each processing element 400(x,y) is controlled to multiply the value in A latch 402 and the value in B latch 403 at the ALU 404. The calculated result is stored into the register matrix 401 in S1116. As a result, a multiplied result (1) is set only at the processing element 400(x1, y1) (in this case, the leading end processing element 400(1, 1)) at the objective address (x1, y1). A multiplied result (0) is set at all the other remaining processing elements 400. In this way, the pixel selecting process (S370) is completed.

When the pixel selecting process (S370) is completed, the program proceeds to S372 (FIG. 10(A)). In S372, the multiplied result obtained in the pixel selecting process (S370) is transferred from the register matrix 401 to the A latch 402. Next, in S374, the calculated result finally obtained in the total sum calculation process (S360) is transferred from the register matrix 401 to the B latch 403. Next, the ALU 404 multiplies the value in A latch 402 and the value in B latch 403 in S376. As a result, at the processing element 400 of the leading end address (1, 1), an image intensity total sum $\Sigma\Sigma I(x,y)$ is obtained as a multiplied result of the calculated total sum $\Sigma\Sigma I(x,y)$ and the value (1). On the other hand, at the other remaining processing elements 400, a zero value (0) is obtained as a multiplied result of the calculated total sum and the value (0). In S378, the multiplied result is stored in the register matrix 401. In S380, the multiplied result is outputted from the output address "28" of the register matrix 401 to the output bus 155. As a result, the multiplied results, which are obtained in S376 at all the processing elements, are outputted to the single output bus 155. In this case, only the processing element 400(1, 1) at the leading end position outputs the image intensity sum $\Sigma\Sigma I(x,y)$ as the multiplied result, while the other remaining processing elements output the zero value (0) as the multiplied results. Accordingly, the output bus 155 transfers, to the control circuit 15, the image intensity sum $\Sigma\Sigma I(x,y)$, which is the logical OR value for the results calculated at all the processing elements 400. The CPU 150 stores the received image intensity sum $\Sigma\Sigma I(x,y)$ in the memory 151.

Next, the center of gravity x-coordinate calculation processings (S400) will be described with reference to FIG. 11.

First, in S402, the CPU 150 reads, from the memory 151, x-direction positional information (x address data "x") of each pixel. This positional information is required to calculate the center of gravity. The CPU 150 transfers each x-direction positional information to the corresponding processing element 400. This transfer operation is performed by temporarily storing each x address data "x" in the x direction data buffer 19, and then transferring the x address data via a corresponding data line 170x in the x direction data bus 17. The x address data is transferred successively from its least significant bit one bit at a time in a bit serial manner. In this case, the same x address data "x" is assigned for all the pixels that are connected to one x direction data line 170x. The x address data is data of a binary number that is indicative of either one of values of 1 to N1. Accordingly, each data line 170x transfers the $\log_2(N1)$ number of bits that constitute the binary number data indicative of the corresponding x address "x". Each data line 170x transfers the $\log_2(N1)$ number of bits one bit at a time from the least significant bit. Thus, each data line 170x can transfer the x address data to all the processing elements 400(x,y) that are located at the corresponding x address.

In each processing element 400(x,y), the transferred address data "x" is stored in the register matrix 401 in S404. Thereafter, the address data "x" is read into the B latch 403 from its least significant bit in S406. Image data I(x,y) is again read from the register matrix 401 into the A latch 402 in S408. The ALU 404 multiplies data in A latch 402 and data in B latch 403 in S410. The multiplied result, that is, the x direction moment value $x \cdot I(x,y)$, is stored in the register matrix in S412.

Next, in S420, a total sum calculation process is executed to determine a total sum of the x direction moments $x \cdot I(x,y)$ of all the pixels.

During the total sum calculation process (S420), the sum calculation process, which is already described with reference to FIG. 10(B), is executed by setting the x direction moment value $x \cdot I(x,y)$ as objective data.

More specifically, in S1002, at each processing element, objective data (an x direction moment value $x \cdot I(x,y)$, for which a sum is desired to be determined) is transferred from the register matrix 401 to the A latch 402. Next, in S1004, each processing element 400(x,y) receives objective data (in this example, $(x+1) \cdot I(x+1, y)$) from another processing element 400(x+1, y) that is located at an adjacent pixel position (x+1, y) in the x direction. Next, in S1006, the x-direction moment value $(x+1) \cdot I(x+1, y)$ is stored into the B latch. In S1008–S1012, by adding data in A latch 402 and data in B latch 403, x direction moment values in the adjacent two pixels are added together, and the added result is stored in the A latch 402 via the register matrix 401. In this way, each pixel 400(x,y) stores therein a sum $(x \cdot I(x,y)+(x+1) \cdot I(x+1, y))$ of x direction moment data at two adjacent pixels.

Next, i is initially set in S1014 to one (1). In S1018–S1026, transfer/adding process is performed so that the calculated result $(x \cdot I(x,y)+(x+1) \cdot I(x+1, y))$ at each processing element is added with another calculated result $((x+2) \cdot I(x+2,y)+(x+3) \cdot I(x+3, y))$ that is stored in another processing element 400(x+2, y) that is located at a position (x+n, y) (where $n=2^i$, in this case, $n=2^1=2$) second closest to the subject pixel position in the x direction.

Next, while successively incrementing i by one (S1028), the processings of S1018–S1030 are repeated. Thus, transfer/addition operation is repeated through the fourth ($n=2^2$) neighboring pixel, the eighth ($n=2^3$) neighboring pixel, the sixteenth ($n=2^4$) neighboring pixel, the 32-th ($n=2^5$) neighboring pixel, the 64-th ($n=2^6$) neighboring pixel, . . . up to the (N1/2)-th neighboring pixel. As a result, a sum of all the x direction moments, $1 \cdot I(1,y)+2 \cdot I(2,y)+ \ldots +N1 \cdot I(N1,y)$, in each row is obtained in the processing element 400(1,y) at the leading edge of the corresponding row.

Next, j is initially set in S1032 to zero (0). In S1034–S1040, transfer/adding process is performed so that an added result at each processing element is added with another added result in another processing element 400(x, y+m) (in this case, 400(x, y+1)) that is located at a position (x, y+m) (where $m=2^j$, in this case, $m=2^j=1$) adjacent to the subject pixel position in the y direction.

Next, while successively incrementing j by one (S1044), the processings of S1046–S1040 are repeated. Thus, transfer/addition operation is repeated through the second ($m=2^1$) neighboring pixel, the fourth ($n=2^2$) neighboring pixel, the eighth ($n=2^3$) neighboring pixel, the sixteenth ($n=2^4$) neighboring pixel, the 32-th ($n=2^5$) neighboring pixel, the 64-th ($n=2^6$) neighboring pixel, . . . up to the (N2/2)-th neighboring pixel. As a result, a sum $\Sigma\Sigma x \cdot I(x,y)$ of the x direction moments of all the pixels is obtained in the processing element 400(1, 1) at the leading end position of the processing element array 40. Then, the sum calculation process (S420) is ended.

Figure 11:
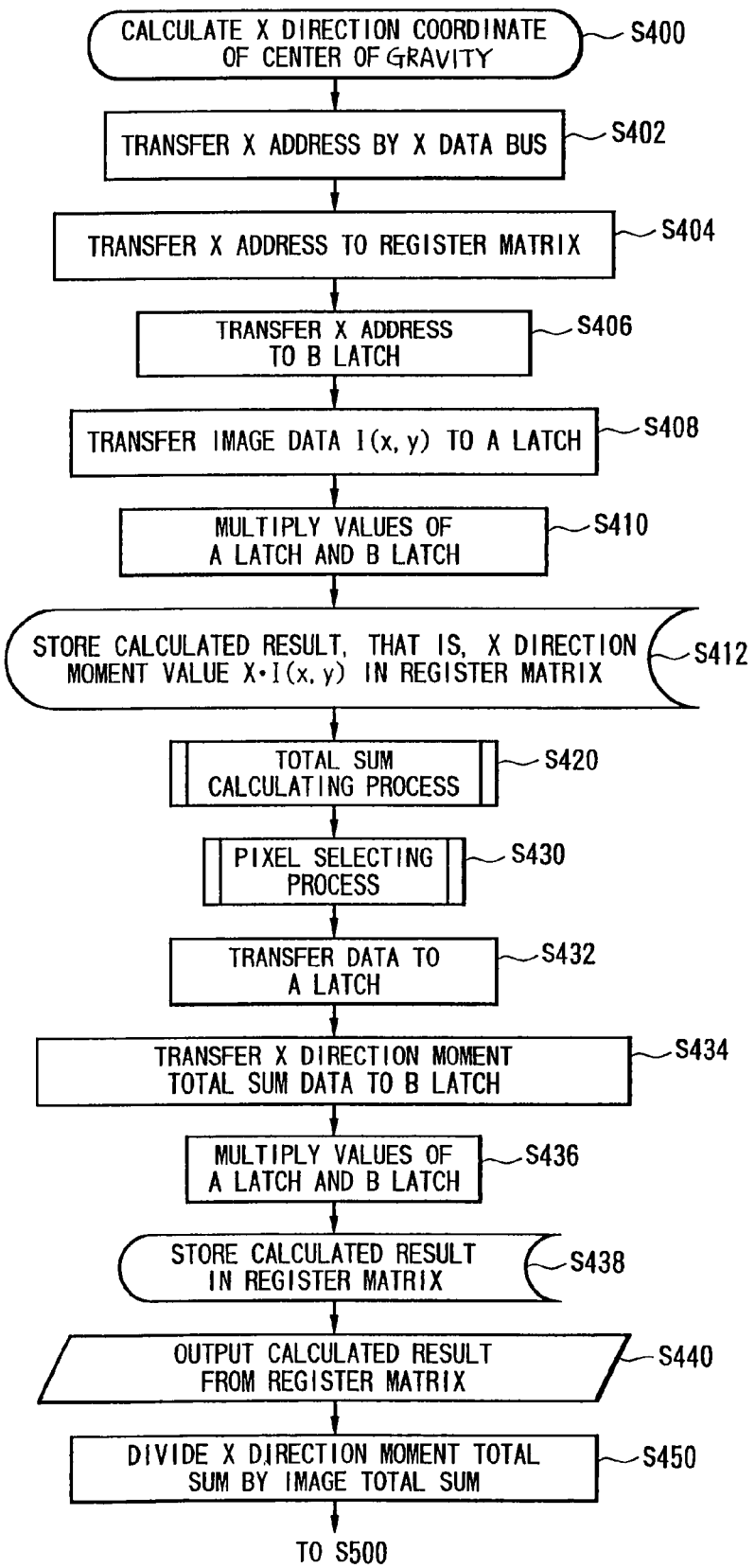
FIG. 11 is a flowchart of an x direction coordinate calculating process in the center of gravity calculating process of FIG. 9.

When the sum calculation process (S420) is completed, the program proceeds to S430 as shown in FIG. 11.

In S430, a pixel selection process is executed to select the leading end pixel position (1, 1).

During the pixel selection process, the process the same as that described with reference to FIG. 10(C) is performed. As a result, in S1114–S1116, the multiplied result (1) is set only at the leading end processing element 400(1, 1), while the multiplied result (0) is set at all the other remaining processing elements 400.

When the pixel selection process (S430) is completed, the program proceeds to S432 as shown in FIG. 11. In S432, the multiplied result obtained in the pixel selecting process (S430) is transferred from the register matrix 401 to the A latch 402. Next, in S434, the calculated result finally obtained in the total sum calculation process (S420) is transferred from the register matrix 401 to the B latch 403. Next, the ALU 404 multiplies the value in A latch 402 and the value in B latch 403 in S436. As a result, at the processing element 400 of the leading end address (1, 1), an x direction moment sum $\Sigma\Sigma x \cdot I(x,y)$ is obtained as a multiplied result of the calculated total sum $\Sigma\Sigma x \cdot I(x,y)$ and the value (1). On the other hand, at the other remaining processing elements 400, a zero value (0) is obtained as a multiplied result of the calculated total sum and the value (0). In S438, the multiplied result is stored in the register matrix 401. In S440, the multiplied result is outputted from the output address "28" of the register matrix 401 to the output bus 155. As a result, the multiplied results, which are obtained at all the processing elements in S436, are outputted to the single output bus 155. In this case, only the processing element 400(1, 1) at the leading end position outputs the x direction moment sum $\Sigma\Sigma x \cdot I(x,y)$ as the multiplied result, while the other remaining processing elements output zero values (0) as the multiplied results. Accordingly, the output bus 155 transfers, to the control circuit 15, the x direction moment sum $\Sigma\Sigma x \cdot I(x,y)$, which is the logical OR value of the results calculated at all the processing elements 400.

Next, in S450, the CPU 150 divides the received x direction moment sum $\Sigma\Sigma x \cdot I(x,y)$ by the image intensity sum $\Sigma\Sigma I(x,y)$ thereby obtaining an x coordinate of the center of gravity.

Next, the program proceeds to S500. In S500, the y coordinate of the center of gravity is calculated in the same manner as described above for obtaining the x coordinate of the center of gravity.

Figure 12:
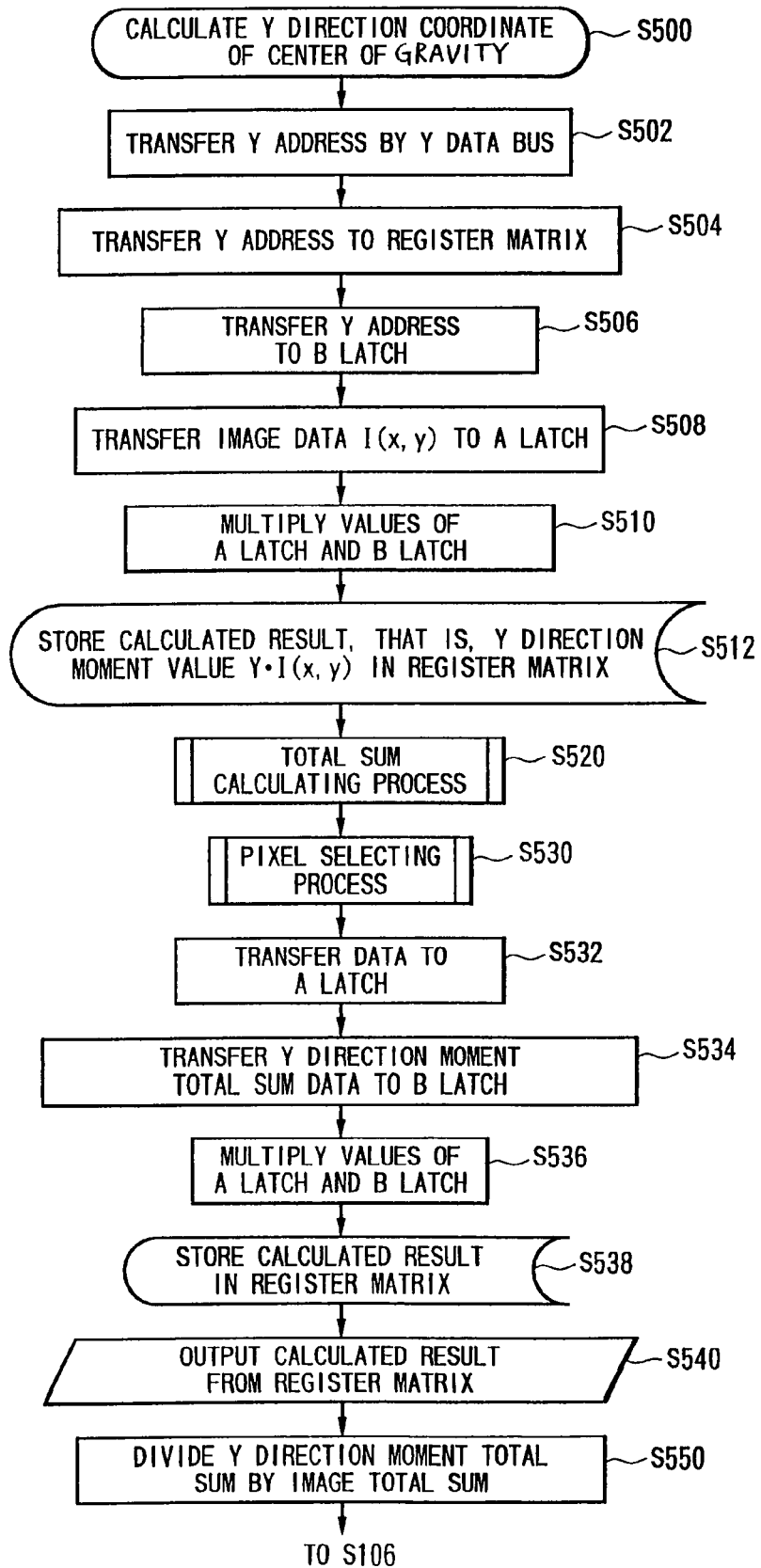
FIG. 12 is a flowchart of a y direction coordinate calculating process in the center of gravity calculating process of FIG. 9.

More specifically, as shown in FIG. 12, first, in S502, the CPU 150 reads, from the memory 151, y-direction positional information (y address data "y") of each pixel. The CPU 150 transfers the y-direction positional information to the processing elements 400 so as to supply each processing element 400 with its y-directional positional information. This transfer operation is performed by temporarily storing each y address data "y" in the y direction data buffer 20, and then transferring the y address data via a corresponding data line 180y in the y direction data bus 18. The y address data is transferred successively from its least significant bit one bit at a time in a bit serial manner. In this case, the same y address data "y" is assigned for all the pixels that are connected to one y direction data line 180y. The y address data is data of a binary number that is indicative of either one of values of 1 to N2. Accordingly, each data line 180y transfers the $\log_2(N2)$ number of bits that constitute the binary number data indicative of the corresponding y address "y". Each data line 180y transfers the $\log_2(N2)$ number of bits one bit at a time from the least significant bit. Thus, each data line 180y can transfer the y address data to all the processing elements 400(x,y) that are located at the corresponding y address.

In each processing element 400(x,y), the transferred address data "y" is stored in the register matrix 401 in S504. Thereafter, the address data "y" is read into the B latch 403 from its least significant bit in S506. Image data I(x,y) is again read from the register matrix 401 into the A latch 402 in S508. The ALU 404 multiplies data in A latch 402 and data in B latch 403 in S510. The calculated result, that is, the y direction moment value $y \cdot I(x,y)$, is stored in the register matrix in S512.

Next, in S520, a total sum calculation process is executed to determine a total sum of the y direction moments $y \cdot I(x,y)$ of all the pixels.

During the total sum calculation process (S520), the sum calculation process, which is already described with reference to FIG. 10(B), is executed by setting the y direction moment value $y \cdot I(x,y)$ as objective data.

More specifically, in S1002, at each processing element, objective data (a y direction moment value $y \cdot I(x,y)$, for which a sum is desired to be determined) is transferred from the register matrix 401 to the A latch 402. Next, in S1004, each processing element 400(x,y) receives objective data (in this example, $y \cdot I(x+1, y)$) from another processing element 400(x+1, y) that is located at an adjacent pixel position (x+1, y) in the x direction. Next, in S1006, the y-direction moment value $y \cdot I(x+1, y)$ is stored into the B latch. By adding data in A latch 402 and data in B latch 403, y direction moment values in the two adjacent pixels are added together, and the added result is stored in the A latch 402 via the register matrix 401 in S1008–S1012. In this way, each pixel 400(x,y) stores therein a sum $(y \cdot I(x,y) + y \cdot I(x+1, y))$ of y direction moment data of two adjacent pixels.

Next, i is initially set in S1014 to one (1). In S1018–S1026, transfer/adding process is performed so that the calculated result $(y \cdot I(x,y) + y \cdot I(x+1, y))$ at each processing element is added with another calculated result $(y \cdot I(x+2,y) + y \cdot I(x+3, y))$ that is stored in another processing element 400(x+2, y) that is located at a position (x+n, y) (where $n=2^i$, in this case, $n=2^1=2$) second closest to the subject pixel position in the x direction.

Next, while successively incrementing i by one (S1028), the processings of S1018–S1030 are repeated. Thus, transfer/addition operation is repeated through the fourth ($n=2^2$) neighboring pixel, the eighth ($n=2^3$) neighboring pixel, the sixteenth ($n=2^4$) neighboring pixel, the 32-th ($n=2^5$) neighboring pixel, the 64-th ($n=2^6$) neighboring pixel, . . . up to the (N1/2)-th neighboring pixel. As a result, a sum of all the y direction moments, $y \cdot I(1,y) + y \cdot I(2,y) + \ldots + y \cdot I(N1,y)$, in each row is obtained in the processing element 400(1,y) at the leading edge of the corresponding row.

Next, j is initially set in S1032 to zero (0). In S1034–S1040, transfer/adding process is performed so that an added result obtained at each processing element is added with another added result at another processing element 400(x, y+m) (in this case, 400(x, y+1)) that is located at a position (x, y+m) (where $m=2^j$, in this case, $m=2^j=1$) adjacent to the subject pixel position in the y direction. As a result, the leading edge processing element 400(1,y), which is located at the leading edge position on each row, obtains a sum $\{[y \cdot I(1,y) + y \cdot I(2,y) + \ldots + y \cdot I(N1,y)] + [(y+1) \cdot I(1,y+1) + (y+1) \cdot I(2,y+1) + \ldots + (y+1) \cdot I(N1,y+1)]\}$ of the added values obtained in two adjacent rows.

Next, while successively incrementing j by one (S1044), the processings of S1046–S1040 are repeated. Thus, transfer/addition operation is repeated through the second ($m=2^1$) neighboring pixel, the fourth ($n=2^2$) neighboring pixel, the eighth ($n=2^3$) neighboring pixel, the sixteenth ($n=2^4$) neighboring pixel, the 32-th ($n=2^5$) neighboring pixel, the 64-th ($n=2^6$) neighboring pixel, ... up to the (N2/2)-th neighboring pixel. As a result, a sum $\Sigma\Sigma y \cdot I(x,y)$ of the y direction moments of all the pixels is obtained in the processing element 400(1, 1) at the leading end position of the processing element array 40. Then, the sum calculation process (S520) is ended.

When the sum calculation process (S520) is completed, the program proceeds to S530 as shown in FIG. 12.

In S530, a pixel selection process is executed to select the leading end pixel position (1, 1).

During the pixel selection process, the process the same as that described with reference to FIG. 10(C) is performed. As a result, in S1114–S1116, the multiplied result (1) is set only at the leading end processing element 400(1, 1), while the multiplied result (0) is set at all the other remaining processing elements 400.

When the pixel selection process (S530) is completed, the program proceeds to S532 as shown in FIG. 12. In S532, the multiplied result obtained during the pixel selecting process (S530) is transferred from the register matrix 401 to the A latch 402. Next, in S534, the calculated result finally obtained in the total sum calculation process (S520) is transferred from the register matrix 401 to the B latch 403. Next, the ALU 404 multiplies the value in A latch 402 and the value in B latch 403 in S536. As a result, at the processing element 400 of the leading end address (1, 1), an y direction moment sum $\Sigma\Sigma y \cdot I(x,y)$ is obtained as a multiplied result of the calculated total sum $\Sigma\Sigma y \cdot I(x,y)$ and the value (1). On the other hand, at the other remaining processing elements, a zero value (0) is obtained as a multiplied result of the calculated total sum and the value (0). In S538, the multiplied result is stored in the register matrix 401. In S540, the multiplied result is outputted from the output address "28" of the register matrix 401 to the output bus 155. As a result, the multiplied results obtained at all the processing elements in S536 are outputted to the single output bus 155. In this case, only the processing element 400(1, 1) at the leading end position outputs the y direction moment sum $\Sigma\Sigma y \cdot I(x,y)$ as the multiplied result, while the other remaining processing elements output zero values (0) as the multiplied results. Accordingly, the output bus 155 transfers, to the control circuit 15, the y direction moment sum $\Sigma\Sigma y \cdot I(x,y)$, which is the logical OR value of the results calculated at all the processing elements 400.

Next, in S550, the CPU 150 divides the received y direction moment sum $\Sigma\Sigma y \cdot I(x,y)$ by the image intensity sum $\Sigma\Sigma I(x,y)$, thereby obtaining a x coordinate of the center of gravity.

EXAMPLE 2

The parallel processing method employed by the present system is called SIMD, and is for conducting equivalent processings at all the processing elements. It is possible to attain a more flexible processing by allowing respective pixels to perform different processings or by allowing only a certain pixel to perform a special processing. According to the present embodiment, by using the data buses 17 and 18, it is possible to allow the respective processing elements 400 to perform different processings. This is because it is possible to transfer calculation-control data to the respective processing elements 400 via the x direction data bus 17 and the y direction data bus 18.

For example, when it is desired to allow only a certain pixel to perform a special processing, the objective pixel ((x1, y1), for example) is designated by the x direction data bus 17 and the y direction data bus 18. That is, data (1) is transferred through the lines of (x1, y1) while data (0) is transferred through the other remaining lines. Each processing element 400 multiplies the received data to data already retained therein, before performing image processing operation. As a result, only the processing element at position (x1, y1) can perform image processing operation.

Figure 13:
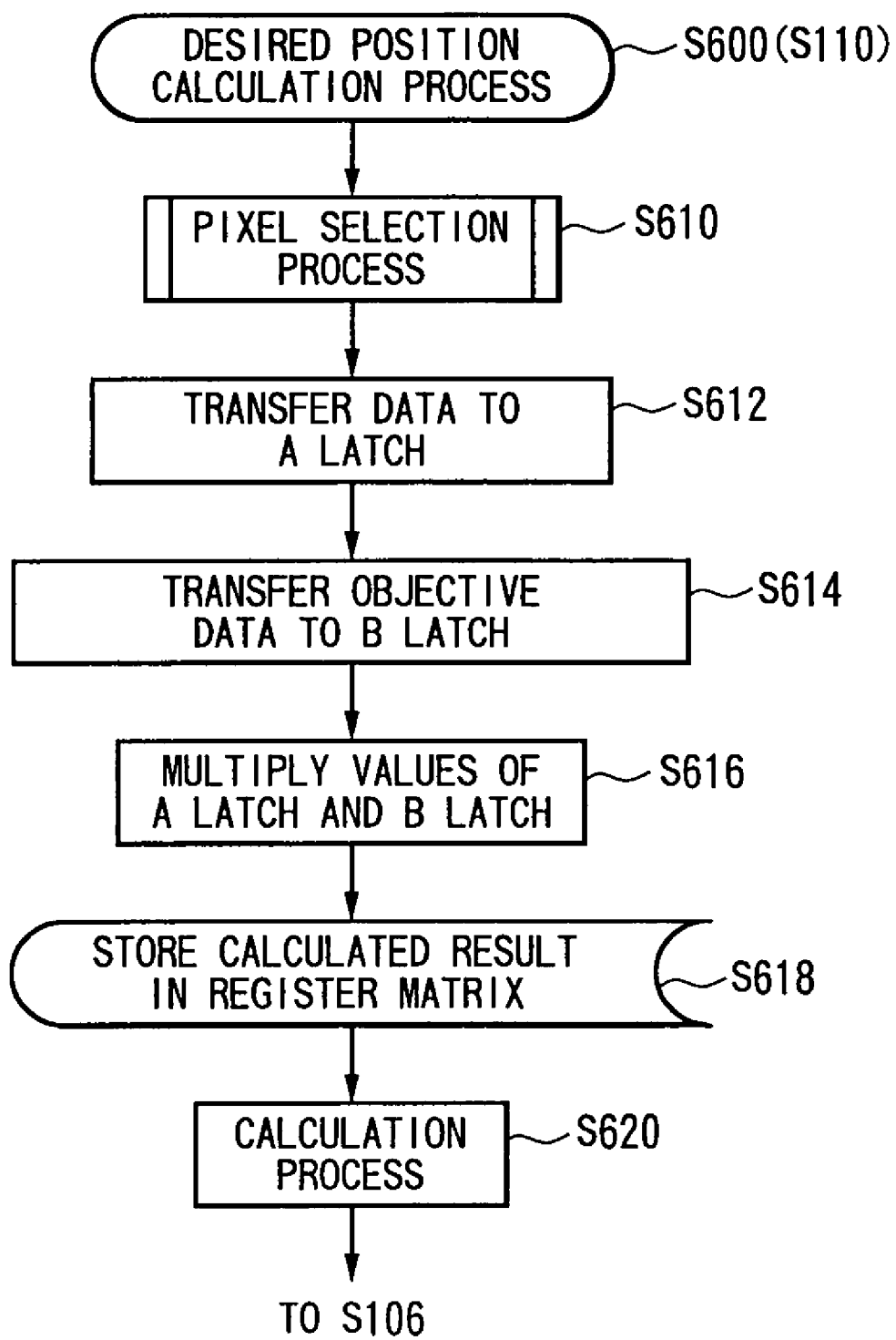
FIG. 13 is a flowchart of a desired position calculation process, which is another example of the step S110 in FIG. 8.

More specifically, a desired position processing (S600) is performed as shown in FIG. 13 during the image processing step S110 of FIG. 8.

It is noted that when the desired position processing (S600) is started, image data I(x, y) at each pixel of the input image D has already been transferred in S104 (FIG. 8) from the corresponding transfer shift register 410 to the register matrix 401 of the corresponding processing element 400(x, y), and is being stored in some region in the register matrix 401.

During the desired position processing (S600), first, in S610, a pixel selection process is performed to select a desired pixel position (x1, y1). During the pixel selection process (S610), the pixel selection process described already with reference to FIG. 10(C) is executed to select the desired pixel position (x1, y1).

More specifically, in S1102–S1106, the CPU 150 transfers data (1) to an x-direction data line 170x (x=x1) with its x address being the same as the x address x1 of the objective pixel position (x1, y1). The CPU 150 transfers data (0) to all the other remaining x-direction data lines 170x (x ≠x1). In this way, among all the processing elements 400, only the processing elements 400(x1, y) (1≦y≦N2), whose x addresses are x1, are set with data (1). The other remaining processing elements 400 are set with data (0). Next, in S1108–S1112, the CPU 150 transfers data (1) to a y-direction data line 180y (y=y1) with its y address being the same as the y address y1 of the objective pixel position (x1, y1). The CPU 150 transfers data (0) to all the other remaining y-direction data lines 180y (y≠y1). In this way, among all the processing elements 400, only the processing elements 400(x, y1) (1≦x≦N1), whose y addresses are y1, are set with data (1). The other remaining processing elements 400 are set with data (0).

Next, in S1114, each processing element 400(x,y) is controlled to multiply data transferred from the x direction data line 170x and data transferred from the y direction data line 180y. The multiplied result is stored into the register matrix 401 in S1116. Thus, the pixel selection process (S610) is completed. As a result, a multiplied result (1) is obtained only in the processing element 400(x1, y1) at the desired address (x1, y1). A multiplied result (0) is obtained in all the other processing elements 400.

When the pixel selecting process (S610) is completed, the program proceeds to S612 (FIG. 13). In S612, the multiplied result obtained during the pixel selection process (S610) is transferred from the register matrix 401 to the A latch 402. Next, in S614, objective data (image data I(x,y), for example) desired to be subjected to a calculation processing is transferred from the register matrix 401 to the B latch 403. Next, the value in A latch 402 and the value in B latch 403 are multiplied in S616. As a result, at the processing element 400 of the objective pixel position (x1, y1), the objective data is obtained as it is. On the other hand, at the other remaining processing elements 400, zero (0) data is obtained. In S618, the multiplied result is stored in the register matrix 401. Thereafter, in S620, a desired processing is performed onto the multiplied result. More specifically, the multiplied result obtained in S616 is transferred from the register matrix 401 to the A latch 402 or the B latch 403. Then, the ALU 404 performs a predetermined processing.

As a result, only at the objective pixel position (x1, y1), processing is performed onto the objective data. At the other remaining pixel positions, processing is performed onto the zero (0) data. Results obtained by the processings are outputted to the control circuit 15 via the output bus 155.

It is noted that in S620, calculation may not be performed. However, the multiplied result obtained in S616 may be directly outputted as it is from the output address "28" to the control circuit 15 via the output bus 155. In this case, the parallel processing system 14 can output only desired data (image data I(x,y), for example), which is obtained at the desired address (x1, y1), to the control circuit 15.

According to the desired position processing (S600) it is possible to allow the respective processing elements to perform different processings, by successively selecting the respective processing elements (pixels) while changing the contents of the processing operations to be executed in S620.

Additionally, it is possible to select a plurality of pixels, rather than selecting only a single pixel, by transferring data (1) to x direction data lines 170x and y direction data lines 180y that correspond to the x addresses and the y addresses of the plural pixels and by transferring data (0) to other remaining data lines. Only at the selected plural pixels, the multiplied results obtained in S1114 (FIG. 10(C)) become 1, and as a result, the objective data is obtained in S616 (FIG. 13) as the multiplied data. Accordingly, in S620, the parallel processing system 14 can perform a desired processing onto the objective data at the selected plural pixels.

As the calculation processing performed in S620, various processing operations, such as an edge-enhancement operation to be described later, can be performed.

EXAMPLE 3

By using the data buses 17 and 18, it is possible to retrieve a content (calculated result) from the register matrix 401 of a certain processing element 400 after all the processing elements perform predetermined calculations.

Figure 14:
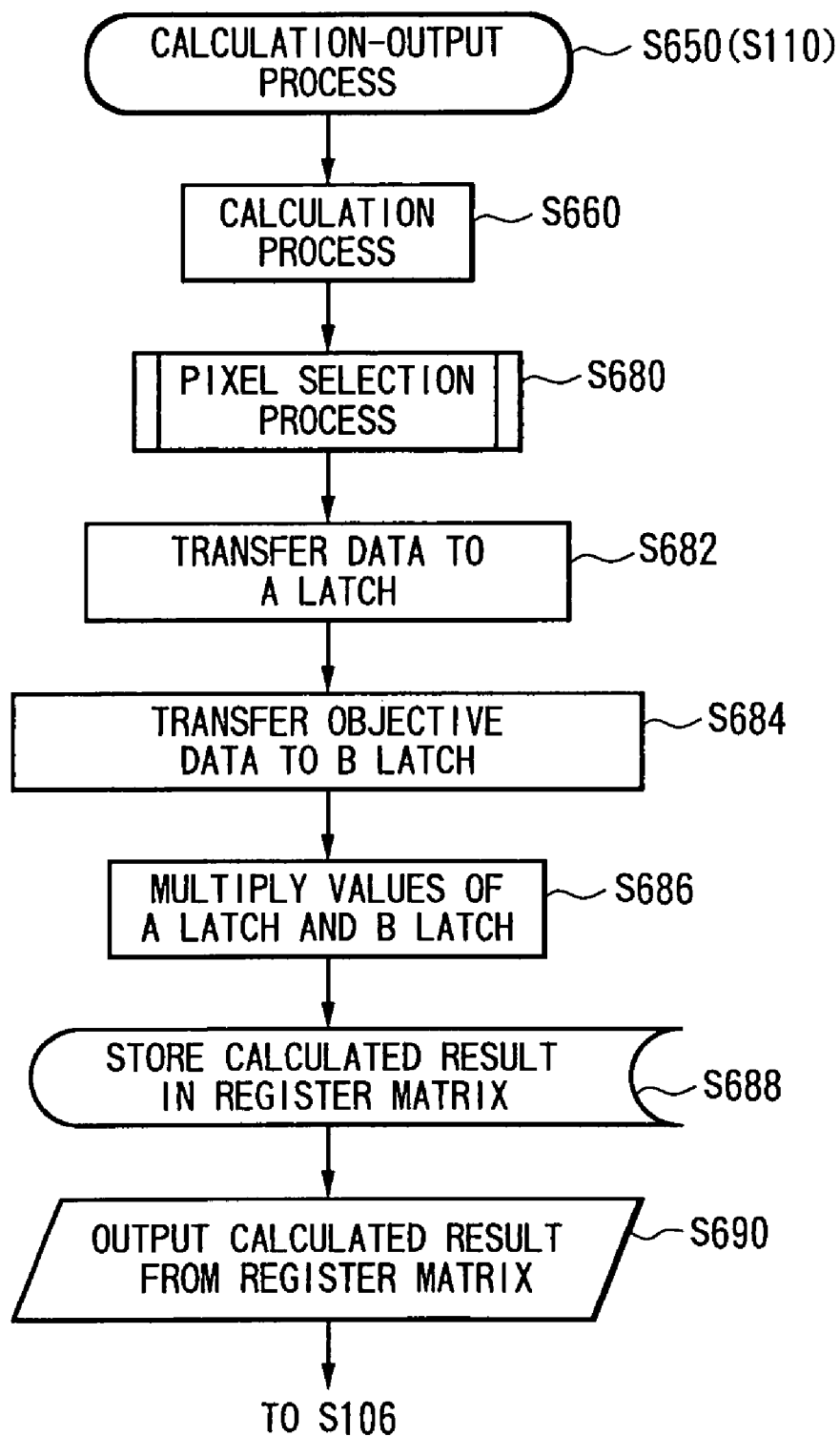
FIG. 14 is a flowchart of a calculation-output process, which is still another example of the step S110 in FIG. 8.

In more concrete terms, a calculating-outputting process (S650) can be performed as shown in FIG. 14 during the image processing procedure S110 of FIG. 8.

It is noted that when the calculating-outputting process (S600) is started, image data I(x, y) at each pixel of the input image D has already been transferred in S104 (FIG. 8) from the corresponding transfer shift register 410 to the register matrix 401 of the corresponding processing element 400(x, y), and is being stored in some region in the register matrix 401.

During the calculating-outputting process (S650), first, in S660, each processing element 400 is controlled to perform a desired calculation onto image data I(x,y). As the desired calculation, various processings, such as the edge-enhancement process, can be employed.

Next, a pixel selecting process (S680) is conducted to select an objective pixel position (x1, y1). During the pixel selecting process (S680), the pixel selecting process that is described already with reference to FIG. 10(C) is executed onto the objective pixel (x1, y1). As a result, data (1) is set as a multiplied result of S1114 only at the objective processing element 400(x1, y1), and data (0) is set as a multiplied result of S1114 at all the other remaining processing elements 400.

When the selecting process (S680) is completed, the program proceeds to S682 (FIG. 14). In S682, the multiplied result obtained during the pixel selecting process (S680) is transferred from the register matrix 401 to the A latch 402. Next, the objective data (calculated result in S660), which is desired to be outputted, is transferred from the register matrix 401 to the B latch 403 in S684. Then, the value in A latch 402 and the value in B latch are multiplied in S686. As a result, the calculated result is obtained as it is in the processing element 400 only at the objective pixel position (x1, y1). Data of (0) is obtained at the other remaining processing elements 400. After the multiplied result is stored in the register matrix 401 in S688, the multiplied result is outputted in S690 from the output address "28" to the output bus 155. The multiplied results of S686 are outputted to the output bus 155 from all the processing elements 400. Accordingly, the calculated result at the objective pixel 400(x1, y1) is outputted to the control circuit 15 as a logical OR value of the multiplied results obtained at all the processing elements.

EXAMPLE 4

It is possible to use a bi-directional data bus, rather than a one-directional data bus, as each of the x direction data bus 17 and the y direction data bus 18. The one-directional data bus has only a transfer/writing function to transfer data from the control circuit 15 to the processing elements 400 and to write the data to the processing elements 400. The bi-directional data bus has both of: the transfer/writing function to transfer data from the control circuit 15 to the processing elements 400 and write data into the processing elements 400, and an output/transferring function for outputting data from the processing elements 400 and transferring the outputted data from the processing elements 400 to the control circuit 15. By using the addresses 30 and 31 of the register matrix also as outputs for the y direction data line 180y and the x direction data line 170x, results calculated by the processing element 400 can be outputted via the y direction data line 180y or the x direction data line 170x to the control circuit 15.

By using the bi-directional data buses as the data buses 17 and 18 and using them bi-directionally, the control circuit 15 can receive a signal from some processing element 400 that is located at a certain position in the x and y directions. By using this function, the control circuit 15 can search some image (m1×m2 pixels) under investigation through a parallel processing procedure. That is, the control circuit 15 can confirm within a short period of time the position where a matching signal is obtained.

One example of the image searching operation will be described below.

This searching operation is for determining whether a search pattern P is located within an input image D (= I(x,y), where 1≦x≦N1, 1≦y≦N2). The searching operation is further for, when it is determined that the search pattern P is located within the input image D, detecting a position where the search pattern P is located. Many algorithms have been reported as examples of a matching algorithm. In this example, one of the most simple algorithms is employed. This algorithm determines that two images are identical when a distance "ERROR(p,q)", represented by the following formula, between the two images is smaller than a threshold value. Here, (p,q) is a position of a reference pixel (x,y) within the image D.

$$ERROR(p, q) = \sum_{i=1}^{m1} \sum_{j=1}^{m2} |I(p + i, q + j) - P(i, j)| \quad (2)$$

Figure 15:
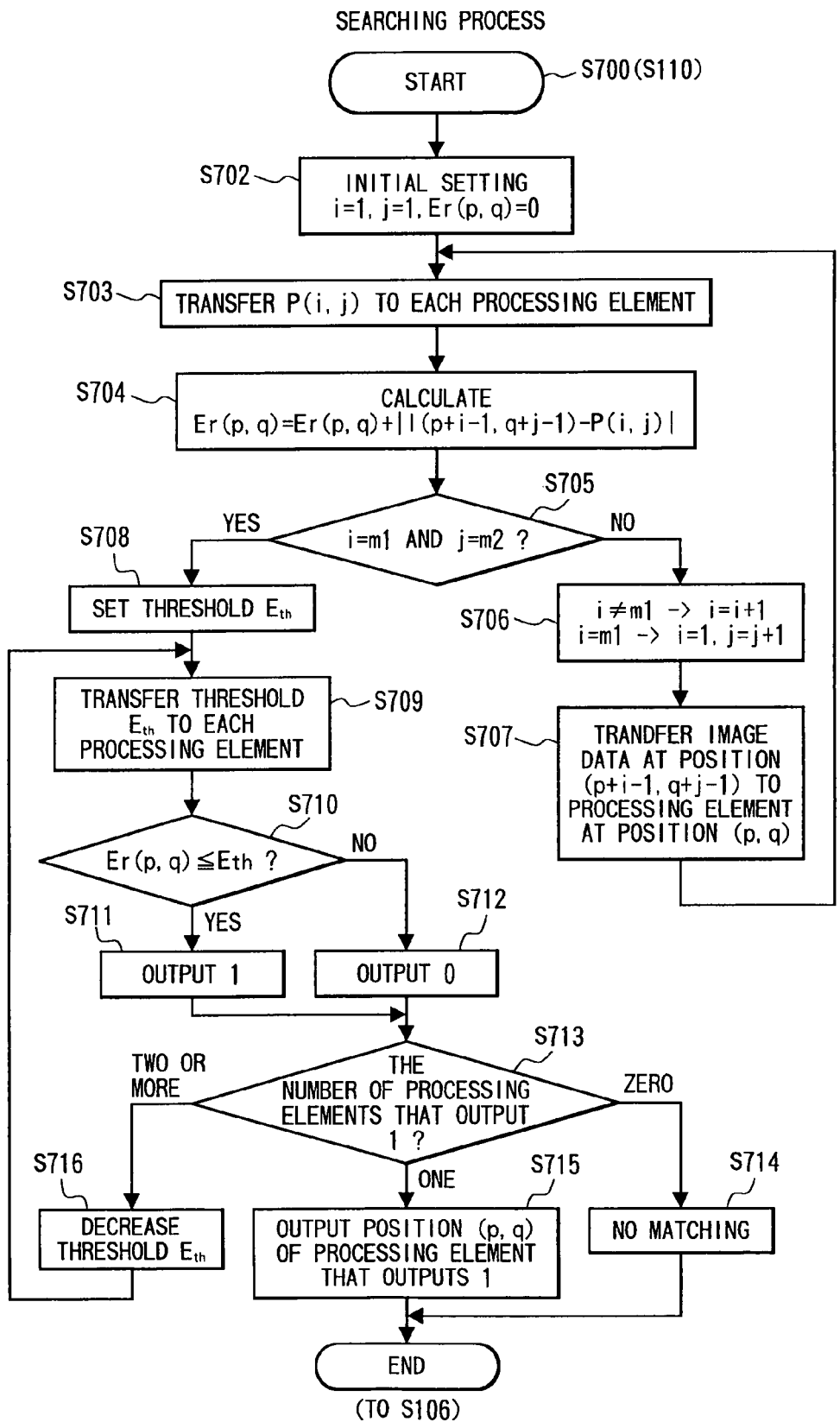
FIG. 15 is a flowchart of an image searching process, which is another example of the step S110 in FIG. 8.

FIG. 15 shows a flowchart of a searching process (S700), which is established based on this algorithm. The flow of data processes will be described below with reference to this drawing.

It is noted that the searching process (S700) is executed during the image processing step S110 of FIG. 8. Each pixel (x,y) is defined as a reference position (p,q) for the image searching operation. The image data P(i,j) ($1 \leq i \leq m1$, $1 \leq j \leq m2$) of the search image P is stored in the memory 151 of the control circuit 15.

It is also noted that when the searching process (S700) is started, image data I(x, y) (which will be referred to as "I(p, q)" hereinafter) at each pixel in the input image D has already been transferred in S104 (FIG. 8) from the corresponding transfer shift register 410 to the register matrix 401 of the corresponding processing element 400(x,y) (which will be referred to as "400(p, q)" hereinafter), and is being stored in some region in the register matrix 401.

During the search process (S700), the CPU 150 first performs an initial-setting operation in S702. More specifically, a leading end position (1, 1) is set to a matching detection position (i, j) within the search pattern P. A calculated result Er(p, q), to be stored in the register matrix 401 of each processing element 400(p, q), is reset.

In S703, image data P(i,j), at the present detecting position (i,j) (which is now a leading end position (1, 1)) within the search pattern P, is read out from the memory 151. The image data is transmitted via the data bus 17, 18 to each processing element 400.

In S704, each processing element 400 calculates an absolute value of a difference between image data I(p,q), at the subject pixel, which is stored in some region of the register matrix, and image data P(i, j) at the matching detection position of the search pattern. The processing element 400 adds the calculated absolute value to the value Er(p,q). More specifically, the absolute value of the difference between the image data I(p,q) and the image data P(1,1), at the leading end position of the search image, is first calculated. Then, another region is assigned in the register matrix 401, and the calculated absolute value is stored as a value Er(p,q) in that region.

In S705, the CPU 150 judges whether the detection position (i, j) reaches the final position (m1, m2). In this case, the detection position (i, j) is still at the leading end position (1, 1), but does not reach the final position (no in S705). Accordingly, the program proceeds to S706. In S706, when i≠m1, only the value i is incremented by one (1). When i=m1, it is determined that the detection position reaches the trailing end in the x direction. Thus, i is reset to one (1), and j is incremented by one (1). In this case, i=1 and j=1, and therefore i and j are renewed into i=2 and j=1. In S707, image data at position (p+i−1, q+j−1) (in this case, image data I(p+1,q) at position (p+1,q)), is transferred to the register matrix 401 of the processing element 400(p,q). More specifically, by using the transferring function of the register matrix 401 to its neighboring register matrix 401, image data value I(p+1, q), which is stored in the neighboring pixel 400(p+1,q), is transferred to a vacant region in the subject pixel 400(p,q).

When the transfer operation is completed, the program returns to S703, in which the CPU 150 retrieves, from the memory 151, image data P(i, j) at the present location (i, j) (in this case, (2,1)) within the search pattern P. The CPU 150 transfers the retrieved image data to each processing element 400(p,q) via the data bus 17, 18. In S704, each processing element 400(p, q) calculates the absolute value of a difference between the image data P(i, j), at the present matching detection position of the search pattern, and the image data I(p+1, q), at a pixel adjacent to the subject processing element 400(p,q). It is noted that the image data I(p+1, q) is presently being stored in the register matrix 401 of the processing element 400(p,q). The processing element 400(p, q) adds the calculated absolute value to the value Er(p,q). Because the detection position (i,j) does not yet reach the final position (m1,m2) (no in S705), the program proceeds to S706, and the detection position (i,j) is renewed.

The above-described processes (S703–S707) are repeated until the detection position (i,j) reaches the final position (m1,m2).

By repeatedly performing the adding operation in S704 in this way, each processing element 400(p, q) can obtain a value ERROR(p,q).

It is noted that the transfer operation in S707 may be performed by successively transferring data to neighboring pixels in x and y directions.

When the detection position reaches the final position (m1,m2) and when the value ERROR(p,q) is obtained, the program proceeds from S705 (yes in S705) to S708. In S708, the CPU 150 sets a threshold value $E_{th}$. In S709, the CPU 150 transfers the set threshold value $E_{th}$ to each processing element 400 via the data bus 17 or 18.

In S710, each processing element 400(p,q) compares the calculated value ERROR(p,q), that is, Er(p,q) with the threshold $E_{th}$. More specifically, each processing element 400(p,q) calculates a value of "ERROR(p,q)−threshold value $E_{th}$", and outputs, as a compared result, a bit of a sign bit (positive or negative sign) of the calculated result. That is, when Er(p,q) is smaller than or equal to threshold value $E_{th}$, the program proceeds to S711, and outputs one (1). When Er(p,q) is greater than threshold value $E_{th}$, the program proceeds to S712, and outputs zero (0). Each processing element 400 outputs the output data to both of the data buses 17 and 18. The CPU 150 calculates a total sum of output signals transferred from the data buses 17 and 18, thereby counting the total number of processing elements that output one (1).

In S713, the CPU 150 judges the counted number. When the counted number is zero (0), the program proceeds to S714, and it is confirmed that there is no image matching.

When the counted number is one (1), only a single data line 170x and only a single data line 180y output signals (1) among the data buses 17 and 18. Accordingly, in S715, the CPU 150 determines positional data (p,q) of the processing element 400 that outputs one (1), based on the positions x and y of the output signal lines 170x and 180y that output signals (1).

It is noted that the output bus 155 may be used instead of the data buses 17 and 18. That is, each processing element 400 can be controlled to multiply an output (0 or 1: a judged result in S710) by its positional data (p,q) and to output the multiplied result to the output bus 155. In this case, only a pixel (matching position pixel), that outputs an output signal of one (1) as a judging result of S710, outputs the positional data (p,q). All the other remaining pixels output values (0) that are the products of their output signals (0) and the positional data (p,q). Accordingly, only the positional data (p,q) of the matching position will be transferred to the control circuit 15 via the output bus 155. According to this method, it is possible to transfer, to the control circuit 15, not only the matching position data (p,q) but also other matching calculated results, such as the absolute value of the difference between the input image D and the search pattern P.

On the other hand, when the counted number is two or more, the threshold $E_{th}$ is decreased in S716, and then the program returns to S709. Thus, the searching range is successively decreased until the counted number becomes one (1).

As described above, the high-speed vision sensor 10 of the present embodiment includes the analog-to-digital converter array 13 and the parallel processing system 14. The analog-to-digital converter array 13 has one analog-to-digital converter 210 in correspondence with all the photodetectors 120 that belong to each row of the photodetector array 11. In the parallel processing system 14, the processing elements 400 are provided in one to one correspondence with the photodetectors 120, and the shift registers 410 are provided also in one to one correspondence with the photodetectors 120. The high-speed vision sensor further includes data buses 17 and 18 and data buffers 19 and 20 for performing data transferring operation to the processing elements 400. The processing elements 400 can perform high-speed image processings between their neighboring pixels by parallel processing. Further, by using the data buses 17 and 18, it is possible to perform, at a high speed, even such a calculation processing that requires data to be transmitted from outside.

According to the high speed vision sensor 10 of the present embodiment, during the image processing step S110, before achieving the above-described image processes (FIGS. 9–15), a preprocessing can be performed to attain various image processings onto the input image I(x,y).

For example, an "edge-enhancement" can be performed. It is noted that "edge-enhancement" is one of the processes that are used most frequently in image processing. In order to calculate the edge-enhancement in one of the simplest manners, a two-neighboring edge-enhancement is employed to calculate a difference between image intensity at each pixel and image intensity at a neighboring pixel on the left side thereof.

More specifically, if the input image intensity at a position (x, y) is I(x, y), then image intensity data I'(x, y) of a two-neighboring edge-enhancement image can be expressed by the following equation:

$$I'(x, y) = |I(x, y) - I(x-1, y)|.$$

Figure 16:
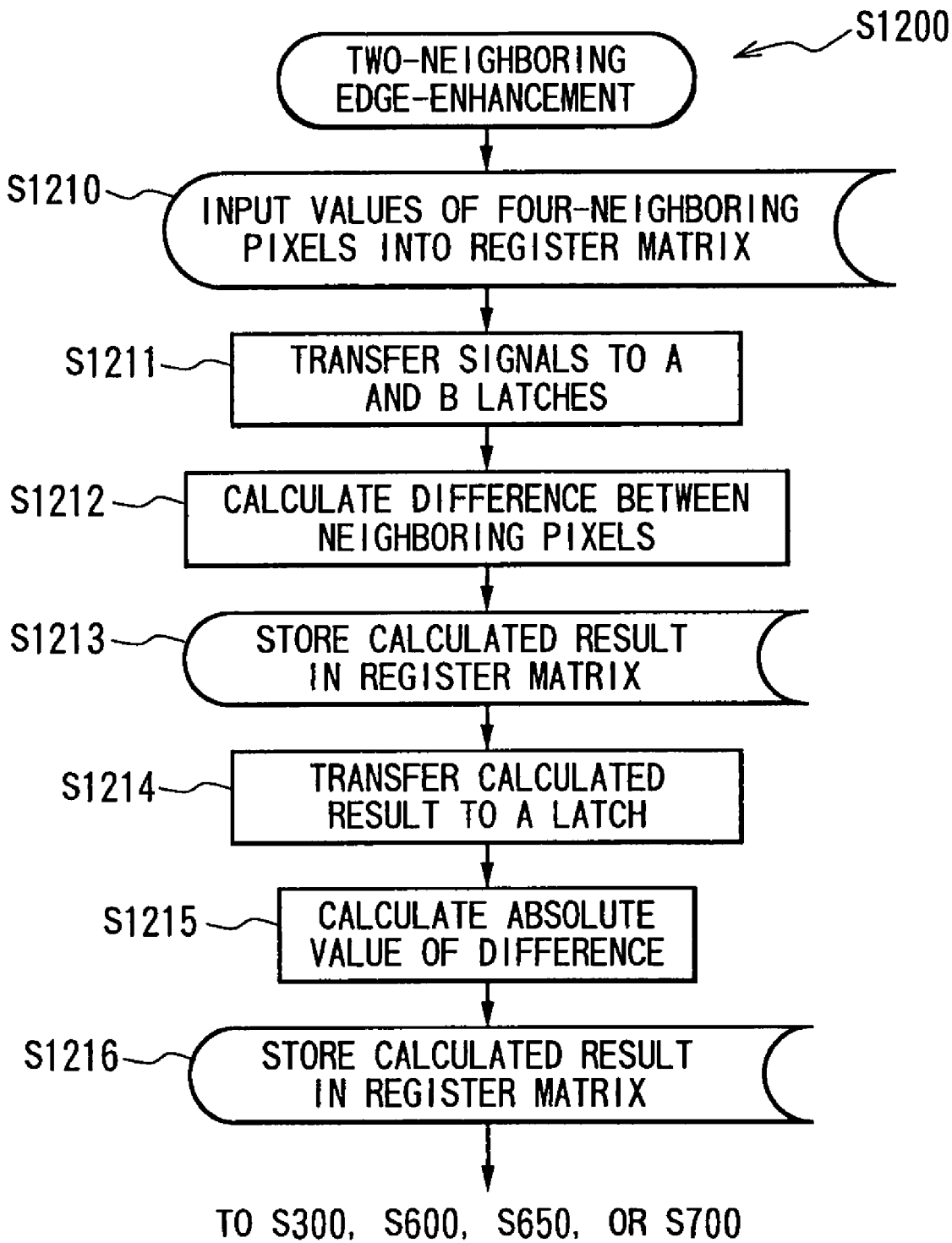
FIG. 16 is a flowchart of an edge-enhancement process, which is one example of a preprocess executed during the step S110 in FIG. 8.

In order to perform a two-neighboring edge-enhancement operation as a preprocess during the image processing step of S110, a two-neighboring edge-enhancement step (S1200) is executed as shown in FIG. 16 before the processes of S300, S600, S650, or S700 in the (Example 1)–(Example 4).

More specifically, first, in S1210, each processing element 400(x,y) receives data I(x−1, y) from its left neighboring pixel. That is, the processing element 400(x,y) receives the data I(x−1, y) at its input terminal for the four neighboring pixels. The data I(x−1, y) is stored in the register matrix 401 of the processing element 400(x, y). Next, in S1211, data I(x, y) and data I(x−1, y) are transferred from the register matrix 401 into the A latch 402 and B latch 403, respectively. In S1212, the ALU 404 calculates the difference between these two values I(x, y) and I(x−1, y). In S1213, the result of the calculation is stored temporarily in the register matrix 401. After this calculation is completed, the result of the calculation is read again into the A latch 402 in S1214. In S1215, the ALU 404 calculates the absolute value of the difference. In S1216, the result of this calculation is stored in the register matrix 401.

The thus obtained two-neighboring edge-enhanced image I'(x,y) is subjected to the image processing step (S300, S600, S650, or S700) in (Example 1)–(Example 4).

It is noted that when performing a four-neighboring edge-enhancement, if the intensity of an input image at point (x, y) is represented by I(x, y), the image intensity I'(x, y) at point (x, y) of a four-neighboring edge-enhancement image can be represented by the following equation:

$$I'(x, y) = I(x, y-1) + I(x, y+1) + I(x-1, y) + I(x+1, y) - 4I(x, y).$$

When performing a four-neighboring smoothing, the image intensity value I'(x, y) of a four-neighboring smoothed image is represented by the following equation:

$$I'(x, y) = (4I(x, y) + I(x-1, y) + I(x+1, y) + I(x, y-1) + I(x, y+1))/8.$$

Table 1 below shows a list showing the number of steps required for performing each of several algorithms, which include the above-described algorithms and other algorithms and which are frequently used in image processing operations. The Table 1 also shows the length of a processing time required for completing each algorithm when the subject algorithm is executed according to the present embodiment.

TABLE 1

| Name of Process | | Number of steps | Time required ($\mu$s) |
|---|---|---|---|
| Two-neighboring edge detection | 1-bit input/output | 5 | 0.40 |
| Four-neighboring edge detection | 1-bit input/output | 11 | 0.72 |
| Four-neighboring smoothing | 1-bit input/output | 14 | 1.0 |
| Four-neighboring edge detection | 8-bit input/output | 70 | 5.6 |
| Four-neighboring edge detection | 8-bit input/output | 96 | 7.7 |
| Four-neighboring thinning | 1-bit input/output | 23 | 1.9 |
| Eight-neighboring thinning | 1-bit input/output | 53 | 4.2 |
| Convolution | 1-bit input, 4-bit output | 40 | 3.2 |
| Convolution | 4-bit input, 11-bit output | 372 | 30 |
| Poisson's equation | 1-bit input, 8-bit output | 63 | 5.0 |

As can be apparent from Table 1, according to the present embodiment, general image processings, such as smoothing, thinning, convolution, correlation, and masking, can be attained extremely rapidly by executing a complete parallel processing. Accordingly, the present embodiment can be applied to such fields, as factory automation (FA) robot control, contrary to conventional vision sensor devices which have slow image processing speeds and slow transfer rates.

It is noted that the length of each calculation time listed in Table 1 does not include the time required by the shift registers 410 to transfer image data. It is also noted that the data transfer rate is limited by the conversion speed of the analog-to-digital converter 210. If the length of time required for analog-to-digital conversion is 1 μs/bit, for example, then the time, required for transferring 128×128 pixels×8 bits' worth of image data in parallel using the 128 rows, would be 128 pixels×8 bits×1 μs/bit≈1 ms. According to the present embodiment, this transfer process is executed in parallel with the calculation processes.

The object of the present embodiment is to provide an image processing system of a practically high speed and sufficiently high resolution. It is noted that the robot control in FA systems requires such a resolution that 128×128 photodetectors 120 or more are arranged. According to the present embodiment, the photodetector array 11 and the parallel processing system 14 can be separated from each other. Accordingly, each device can be constructed with a high level of integration. It is therefore possible to attain the required high resolution. Additionally, the processing speed has to match the actuator speed of a robot (1–10 ms). According to the present embodiment, the processing speed is determined by the speed of the analog-to-digital conversion performed in the analog-to-digital converters 210. This conversion rate can be made sufficiently fast.

For example, according to the present embodiment, the analog-to-digital conversion rate per pixel is 1 μs/bit. It takes 0.768 ms (=6 μs×128) to convert analog signals from all the 128 photodetectors 120 in one row into 6-bit digital signals (64 gradation), for example. It is noted that the processing elements are provided in one-to-one correspondence with the photodetector elements. All the processing elements are operated in parallel. Accordingly, most calculation processings can be completed within 0.4 ms as apparent from Table 1. Additionally, by performing the calculating processes and the transfer processes in parallel, it is possible to reduce the amount of dead time between the respective processes and to shorten the overall processing time.

As described already, each analog-to-digital converter 210 performs analog-to-digital conversion beginning from the most significant bit. Accordingly, it is possible to change the gradation of the analog-to-digital conversion, by outputting a reset signal R after a desired number of bits have been converted so that the process will shift to perform an analog-to-digital conversion of the next optical signal. It is therefore possible to perform complicated processes at a higher rate of speed. For example, in order to track an object which is moving at a high rate of speed, it is preferable to process images in two levels, that is, one bit. In this case, the transfer time can be shortened to 0.128 ms, which is about ⅙ the time required for transferring six bits. This method can therefore be applied to the control of high-speed feedback operation. Conversely, when the object is moving slowly, the gradation can be raised to be able to track the object with a higher precision.

In order to allow the output from the analog-to-digital converter to have a variable bit length, it is necessary to adjust, before inputting the output to the shift registers, the varied bit length of the input to a fixed length. It is noted that a shift register line, for transferring data at a normal length of 8 bits, for example, is constructed from one set of shift registers that has the total fixed length equal to the product of eight bits and the total number (N1) of pixels in one row. In the one set of shift registers, a plurality of eight bit-shift registers, which are spaced from one another and each of which has eight bits, function as individual shift registers to transfer data for their corresponding pixels. Therefore, if the bit length of the image data for each pixel is not fixed to eight bits, then it is impossible to transfer each pixel's worth of image data correctly to the shift register at the corresponding position. For this reason, each pixel's worth of image data is added with a dummy signal to have eight bits in total before the image data is transferred to the shift registers. It can be ensured that image data will be transferred correctly.

As described above, the high-speed vision sensor 10 of the present embodiment includes the analog-to-digital converter array 13 and the parallel processing system 14. The analog-to-digital converter array 13 has one analog-to-digital converter 210 in correspondence with all the photodetectors 120 that belong to each row of the photodetector array 11. In the parallel processing system 14, the processing elements 400 are provided in one to one correspondence with the photodetectors 120, and the shift registers 410 are provided also in one to one correspondence with the photodetectors 120. By providing a processing element 400 in correspondence with each photodetector 120, it is possible to perform, at a high speed, image processing calculations between neighboring pixels by parallel processing.

Additionally, by providing an analog-to-digital converter 210 in each row, it is possible to reduce the number of transfer lines, provided between the photodetectors 120 and the processing elements 400, in comparison to a configuration where an analog-to-digital converter 210 is provided in correspondence with each photodetector 120. The photodetectors 120 and the processing elements 400 can be produced separately, before being assembled together. Accordingly, both components can be manufactured with an optimal level of integration. Production of the high-speed vision sensor 10 having a large number of pixels can be simplified. It is noted that because one analog-to-digital converter 210 is provided for each row, the overall processing speed is limited by the A/D conversion process. However, most processes can be completed within one millisecond, even when 128×128 pixel images, which are sufficient for FA robot control, are processed at a 64 gradation. Such a high-speed processing can be attained. Accordingly, the high-speed vision sensor 10 of the present embodiment not only can be constructed with a simple circuit, but also can perform basic image calculations at a high speed.

Especially, in order to perform a processing that requires data supplied from outside, it is possible to efficiently perform data transfer operation (transmission/reception operation) by using the x direction data bus and the y direction data bus. It is therefore possible to perform high speed calculation.

Further, by providing a shift register 410 in correspondence with each processing element 400, the transfer process can be performed independently from the calculation processing, thereby achieving calculation process and transfer process efficiently. Because the calculation process and the transfer process are executed in parallel, it is possible to reduce wait time between the respective processes and to perform image processing at a faster overall speed. That is, it is possible to attain a function to perform calculation processes and transfer processes independently from each other by using the transfer shift registers to transfer data from the analog-to-digital converters to the processing elements. A real-time operation can be attained.

The high-speed vision sensor of the present invention can be modified in a variety of ways, and is not limited to the above-described embodiment.

For example, in the above-described embodiment, the data buffers 19 and 20 are provided. However, if a sufficiently high transfer speed can be attained between the control circuit 15 and the data buses 17 and 18, it is unnecessary to provide the data buffers.

Figure 17:
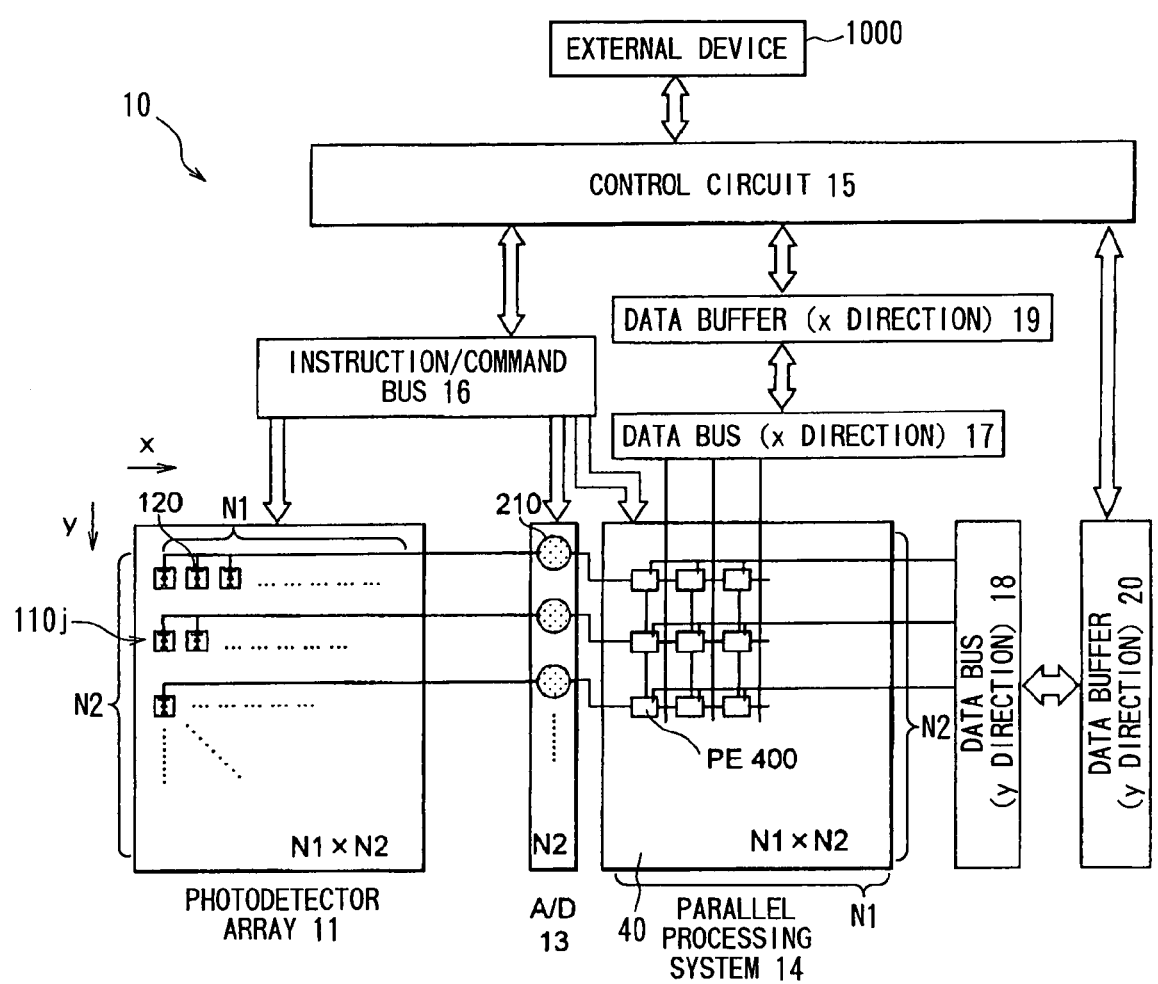
FIG. 17 is a block diagram showing a modification of the high-speed vision sensor of the present invention.

In the above-described embodiment, the data transfer from the analog-to-digital converters 210 to the processing elements 400 is performed by the transfer shift registers 410. However, the transfer shift registers 410 may not be provided. That is, as shown in FIG. 17, each analog-to-digital converter 210 may be connected to a register matrix 401 in a processing element 400(1, y) that is located at a leading edge of a corresponding row in the parallel processing system 14. In this case, pixel data I(x,y) outputted from the analog-to-digital converter 210 on each row is transmitted to a corresponding processing element 400(x,y) by being successively transmitted between the processing elements 400(1,y)–400(x,y) which are successively arranged in the x direction.

If no shift registers 410 are provided, an extra amount of time would be required to transfer image data to the processing elements 400 in addition to the calculating time in Table 1. It is noted that as described already, the analog-to-digital conversion rate per pixel is about 1 $\mu$s/bit. Accordingly, it takes 0.768 ms=6 $\mu$s×128 to convert analog input signals, outputted from all the 128 photodetectors 120 in one row, into 6-bit digital signals (64 gradation). On the other hand, most image processings can be completed within 0.4 ms as apparent from Table 1. Accordingly, even when considering the transfer time, most image processes can be performed within one milliseconds. Thus, a sufficiently high speed can be attained.

Figure 18:
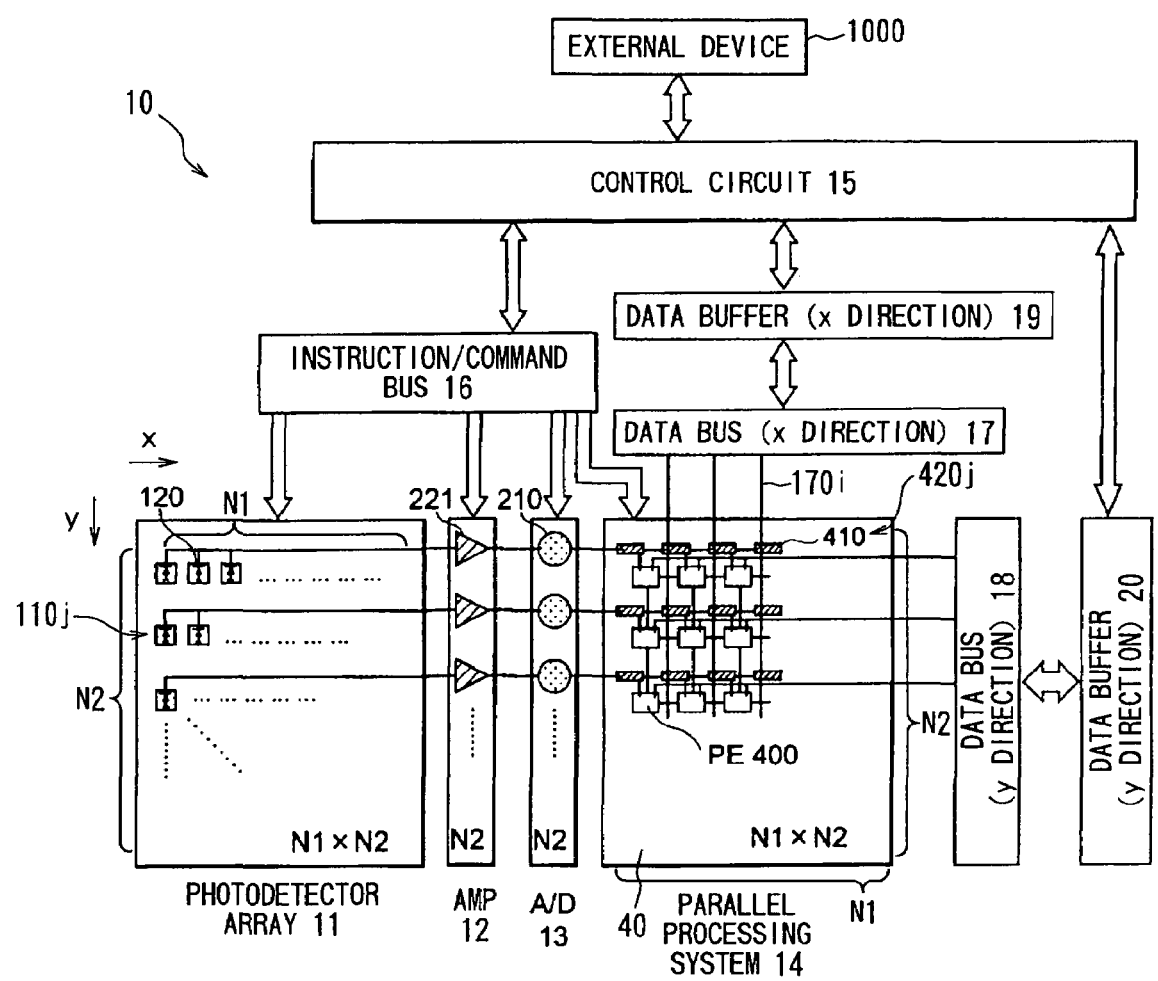
FIG. 18 is a block diagram showing another modification of the high-speed vision sensor of the present invention.

In the above-described embodiment, the analog-to-digital converter 210 includes the charge amp 221. However, the analog-to-digital converter 210 and the charge amp 221 can be provided separately as shown in FIG. 18. As shown in this figure, an amp array 12 is connected to the photodetector array 11. The amp array 12 has N2 charge amps 221. The analog-to-digital converter array 13 is provided between the amp array 12 and the parallel processing system 14. The analog-to-digital converter array 13 has N2 analog-to-digital converters 210. With this construction, each amp 220 in the amp array 12 successively converts charges, outputted from the N1 photodetectors 120 on the corresponding row 110 of the photodetector array 11, into voltage signals. These analog voltage signals are outputted to the corresponding analog-to-digital converter 210 in the analog-to-digital converter array 13. The analog-to-digital converter 210 successively converts the analog voltage signals to digital signals, and supplies the digital signals to the parallel processing system 14.

Additionally, in the above-described embodiment, in order to calculate: the total sum of image intensities, the total sum of x-direction moments, and the total sum of y-direction moments, the total sum calculation process of FIG. 10(B) is executed. Instead, the output bus 155 can be added with a circuit for calculating a total sum of outputs from the processing elements 400. This circuit may be used to calculate the total sums.

INDUSTRIAL APPLICABILITY

The high-speed vision sensor of the present invention can be employed in a wide variety of vision recognition processes, including FA robot control.

What is claimed is:

1. A high-speed vision sensor, comprising:
    a photodetector array having a plurality of photodetectors, which are arranged two-dimensionally in a plurality of rows and in a plurality of columns;
    an analog-to-digital converter array having a plurality of analog-to-digital converters which are arranged one-dimensionally such that each analog-to-digital converter corresponds to one row in the photodetector array, each analog-to-digital converter converting, into digital signals, analog signals which are successively outputted from the photodetectors in the corresponding row;
    a parallel processing system including a parallel processing element array, the parallel processing element array having a plurality of processing elements which are arranged two-dimensionally in a plurality of rows and in a plurality of columns and in one-to-one correspondence with the plurality of photodetectors in the photodetector array, each processing element performing a predetermined calculation on digital signals which are transferred from the analog-to-digital converter array;
    a column-direction data-transfer bus including a plurality of column-direction data-transfer data lines which are arranged in one to one correspondence with the plurality of columns in the parallel processing system, each column-direction data-transfer data line being connected to the processing elements that are located in the corresponding column and performing data transfer operation with each processing element in the corresponding column;
    a row-direction data-transfer bus including a plurality of row-direction data-transfer data lines which are arranged in one to one correspondence with the plurality of rows in the parallel processing system, each row-direction data-transfer data line being connected to the processing elements that are located in the corresponding row and performing data transfer operation with each processing element in the corresponding row; and
    a control circuit controlling the photodetector array, the analog-to-digital converter array, the parallel processing system, the column-direction data-transfer bus, and the row-direction data-transfer bus, and performing data transfer operation with the processing elements via the column-direction data-transfer bus and the row-direction data-transfer bus, the control circuit controlling a combination of data to be transferred via each column-direction data-transfer data line to the corresponding processing elements and data to be transferred via each row-direction data-transfer data line to the corresponding processing elements, thereby controlling each processing element to perform a processing that is determined based on the combination of data received from the corresponding column-direction data-transfer data line and data received from the corresponding row-direction data-transfer data line.

2. A high-speed vision sensor as claimed in claim 1, wherein the control circuit includes a center-of-gravity calculation control portion for controlling each column-direction data-transfer data line to perform data transfer operation to transfer data indicative of positional information of the corresponding column to the processing elements on the corresponding column, for controlling each row-direction data-transfer data line to perform data transfer operation to transfer data indicative of positional information of the corresponding row to the processing elements on the corresponding row, and for controlling each processing element to perform a predetermined calculation to calculate a center of gravity of the digital signals based on the received data indicative of the positional information of the corresponding row and the received data indicative of the positional information of the corresponding column.

3. A high-speed vision sensor as claimed in claim 1, wherein the control circuit includes a control portion for controlling a predetermined processing element to perform a predetermined calculation onto the digital signals by controlling a column-direction data-transfer data line that is connected to the predetermined processing element and a row-direction data-transfer data line that is connected to the predetermined processing element to perform data transfer operation to transfer a predetermined combination of calculation-control data.

4. A high-speed vision sensor as claimed in claim 1, wherein the control circuit includes a data transfer control portion for controlling a column-direction data-transfer data line that is connected to a predetermined processing element and a row-direction data-transfer data line that is connected to the predetermined processing element to perform data transfer operation to transfer a predetermined combination of calculation-control data, thereby allowing calculation result data, obtained at the predetermined processing element, to be transferred to the control circuit.

5. A high-speed vision sensor as claimed in claim 1, further comprising data buffers which are provided in correspondence with the column-direction data-transfer bus and the row-direction data-transfer bus, respectively.

6. A high-speed vision sensor as claimed in claim 1, wherein the parallel processing system further includes a shift register array, the shift register array having a plurality of shift registers which are disposed in one-to-one correspondence with the plurality of analog-to-digital converters and in one-to-one correspondence with the plurality of rows of processing elements, each shift register successively transferring digital signals, which are outputted from the corresponding analog-to-digital converter and which are equivalent to signals outputted from the photodetectors in a corresponding photodetector row, to predetermined processing elements in the corresponding row.

7. A high-speed vision sensor, comprising:
a photodetector array having a plurality of photodetectors, which are arranged two-dimensionally in a plurality of rows and in a plurality of columns;
an analog-to-digital converter array having a plurality of analog-to-digital converters which are arranged one-dimensionally such that each analog-to-digital converter corresponds to one row in the photodetector array, each analog-to-digital converter converting, into digital signals, analog signals which are successively outputted from the photodetectors in the corresponding row;
a parallel processing system including a parallel processing element array, the parallel processing element array having a plurality of processing elements which are arranged two-dimensionally in a plurality of rows and in a plurality of columns and in one-to-one correspondence with the plurality of photodetectors in the photodetector array, each processing element performing a predetermined calculation on digital signals which are transferred from the analog-to-digital converter array;
a column-direction data-transfer bus including a plurality of column-direction data-transfer data lines which are arranged in one to one correspondence with the plurality of columns in the parallel processing system, each column-direction data-transfer data line being connected to the processing elements that are located in the corresponding column and performing data transfer operation with each processing element in the corresponding column;
a row-direction data-transfer bus including a plurality of row-direction data-transfer data lines which are arranged in one to one correspondence with the plurality of rows in the parallel processing system, each row-direction data-transfer data line being connected to the processing elements that are located in the corresponding row and performing data transfer operation with each processing element in the corresponding row; and
a control circuit controlling the photodetector array, the analog-to-digital converter array, the parallel processing system, the column-direction data-transfer bus, and the row-direction data-transfer bus, and performing data transfer operation with the processing elements via the column-direction data-transfer bus and the row-direction data-transfer bus, the control circuit receiving data from each processing element via both of the corresponding column-direction data-transfer data line and the corresponding row-direction data-transfer data line, and determining the position of a processing element that has outputted predetermined data, based on the combination of a column-direction data-transfer data line that has transferred the predetermined data and a row-direction data-transfer data line that has transferred the predetermined data.

* * * * *